(12) United States Patent
Muta et al.

(10) Patent No.: US 8,192,895 B2
(45) Date of Patent: *Jun. 5, 2012

(54) MEMBRANE-MEMBRANE REINFORCING MEMBER ASSEMBLY, MEMBRANE-CATALYST LAYER ASSEMBLY, MEMBRANE-ELECTRODE ASSEMBLY, AND POLYMER ELECTROLYTE FUEL CELL

(75) Inventors: Aoi Muta, Osaka (JP); Takeou Okanishi, Osaka (JP); Atsushi Nogi, Osaka (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 341 days.

This patent is subject to a terminal disclaimer.

(21) Appl. No.: 12/523,300

(22) PCT Filed: Jan. 15, 2008

(86) PCT No.: PCT/JP2008/050329
§ 371 (c)(1),
(2), (4) Date: Jul. 15, 2009

(87) PCT Pub. No.: WO2008/090778
PCT Pub. Date: Jul. 31, 2008

(65) Prior Publication Data
US 2010/0075187 A1    Mar. 25, 2010

(30) Foreign Application Priority Data

Jan. 22, 2007  (JP) ................................. 2007-011591
Mar. 6, 2007   (JP) ................................. 2007-056057

(51) Int. Cl.
*H01M 2/14* (2006.01)
(52) U.S. Cl. .................. 429/508; 429/469; 429/481

(58) Field of Classification Search ................. 429/479, 429/481, 484, 491–494
See application file for complete search history.

(56) References Cited

U.S. PATENT DOCUMENTS
2005/0181249 A1    8/2005 Logan
(Continued)

FOREIGN PATENT DOCUMENTS
JP    62-005569    1/1987
(Continued)

OTHER PUBLICATIONS

United States Notice of Allowance, issued in U.S. Appl. No. 12/530,907, dated Feb. 9, 2012.

*Primary Examiner* — Ula C Ruddock
*Assistant Examiner* — Scott J Chmielecki
(74) *Attorney, Agent, or Firm* — McDermott Will & Emery LLP

(57) ABSTRACT

A membrane-membrane reinforcing member assembly includes: a polymer electrolyte membrane (1) having a substantially quadrilateral shape; a membrane-like first membrane reinforcing member (10a) disposed on a first main surface (F10) of the polymer electrolyte membrane (1) to bend at a substantially right angle at a corner of the polymer electrolyte membrane (1) and extend along sides forming the corner; and a membrane-like second membrane reinforcing member (10b) disposed on a second main surface (F20) of the polymer electrolyte membrane (1) to bend at a substantially right angle at a corner of the polymer electrolyte membrane (1) and extend along sides forming the corner, and the first membrane reinforcing member (10a) and the second membrane reinforcing member (10b) are disposed to extend along four sides of the polymer electrolyte membrane (1) as a whole.

9 Claims, 22 Drawing Sheets

U.S. PATENT DOCUMENTS

| | | | |
|---|---|---|---|
| 2005/0181267 A1* | 8/2005 | Mitsuta et al. | 429/40 |
| 2005/0227132 A1 | 10/2005 | Hori et al. | |
| 2006/0046121 A1* | 3/2006 | Shimohira et al. | 429/30 |

FOREIGN PATENT DOCUMENTS

| | | |
|---|---|---|
| JP | 05-021077 | 1/1993 |
| JP | 05-242897 | 9/1993 |
| JP | 07-220742 | 8/1995 |
| JP | 08-259710 | 10/1996 |
| JP | 10-154521 | 6/1998 |
| JP | 2003-082488 | 3/2003 |
| JP | 2006-338938 | 12/2006 |
| WO | WO 2005/081343 A1 | 9/2005 |
| WO | WO 2005/086264 A1 | 9/2005 |
| WO | WO 2006/025335 A1 | 3/2006 |
| WO | WO 2006/137203 A1 | 12/2006 |
| WO | WO 2007/032442 A1 | 3/2007 |

* cited by examiner

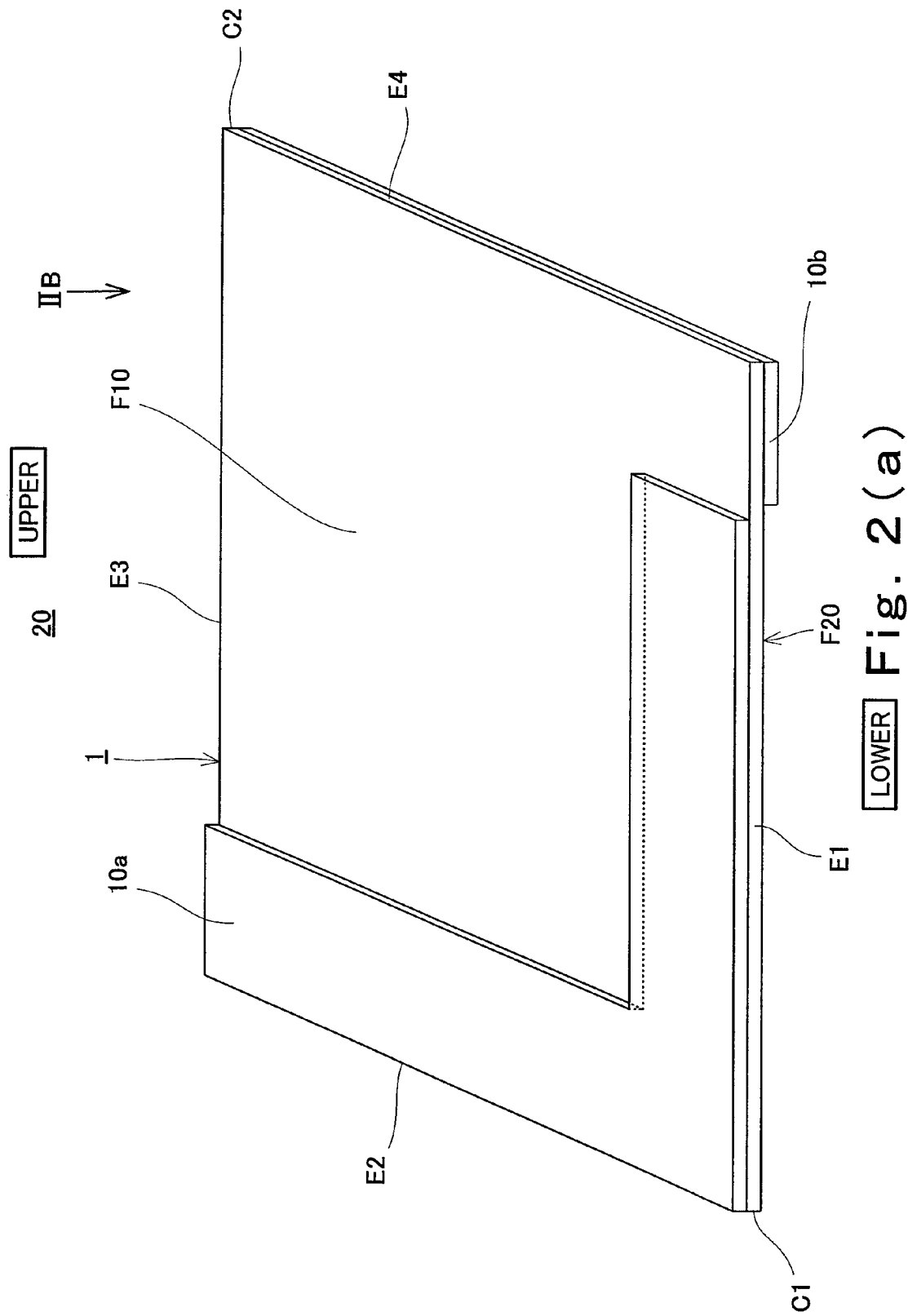

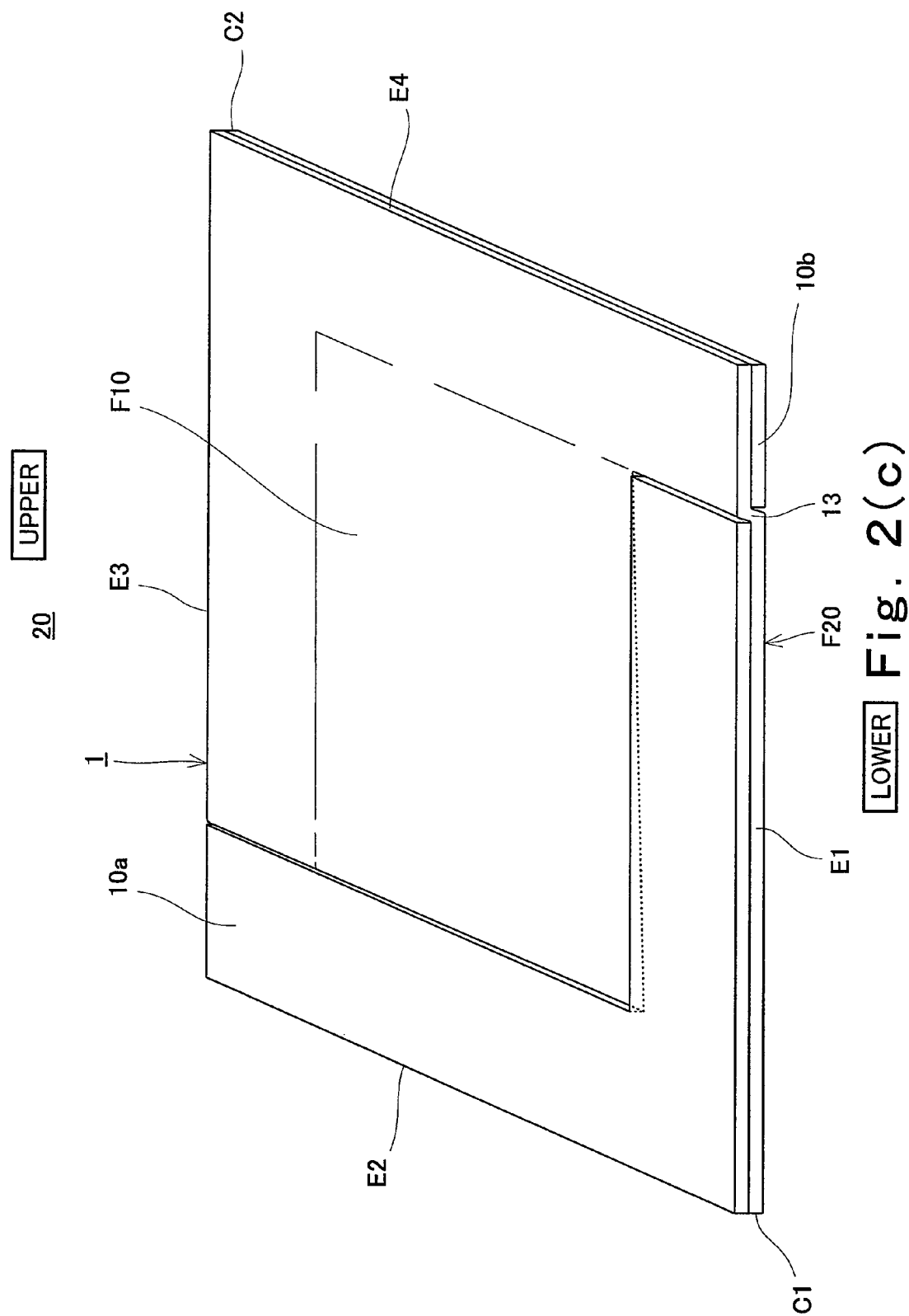

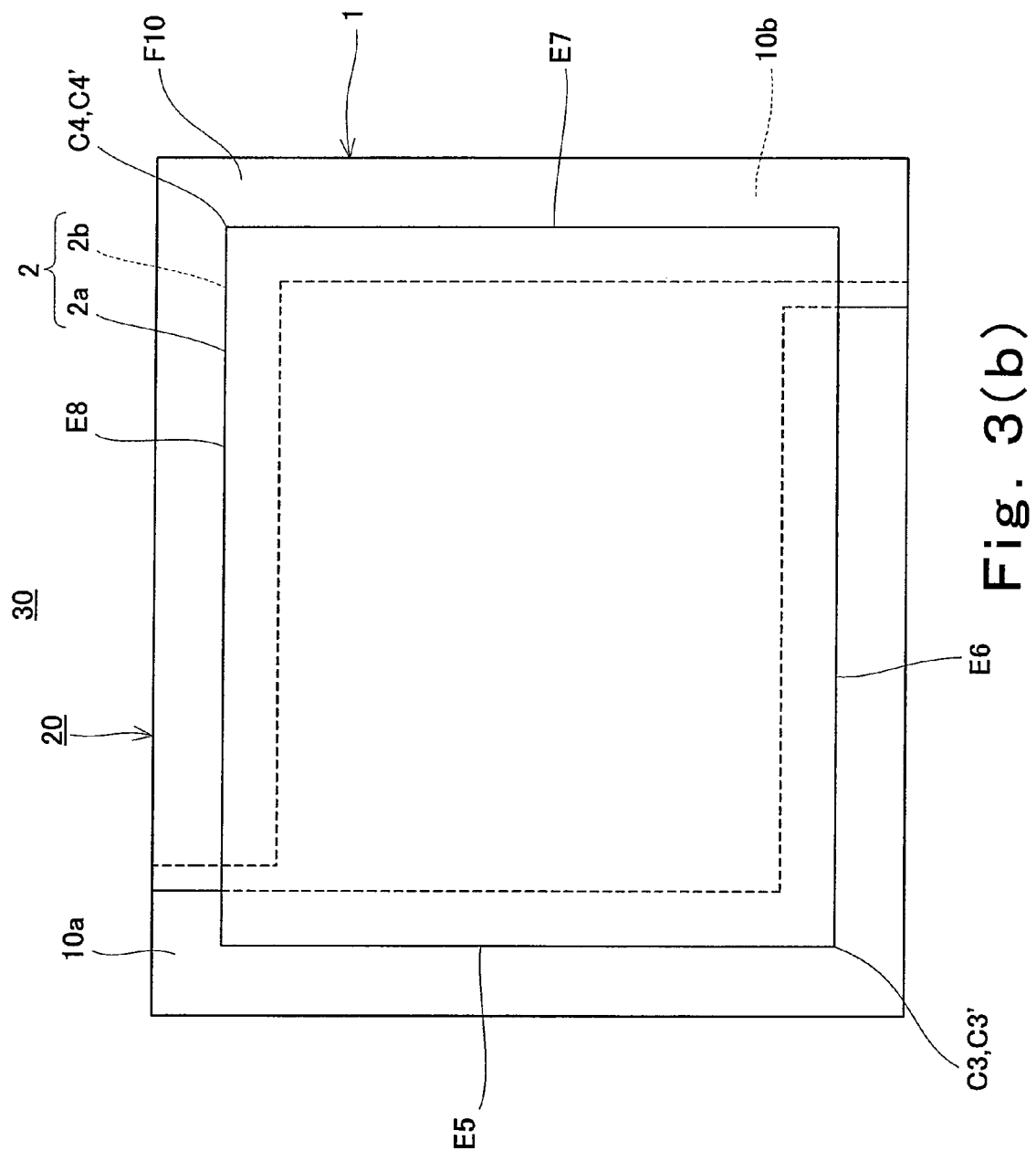

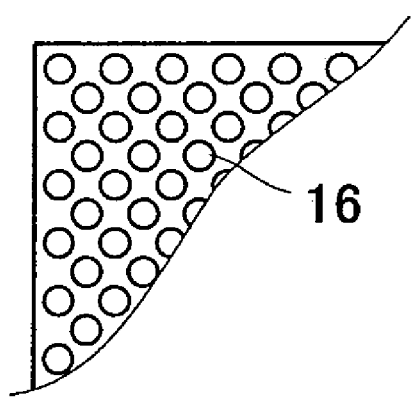
Fig. 8

MEMBRANE-MEMBRANE REINFORCING MEMBER ASSEMBLY, MEMBRANE-CATALYST LAYER ASSEMBLY, MEMBRANE-ELECTRODE ASSEMBLY, AND POLYMER ELECTROLYTE FUEL CELL

RELATED APPLICATIONS

This application is the U.S. National Phase under 35 U.S.C. §371 of International Application No. PCT/JP2008/050329, filed on Jan. 15, 2008, which in turn claims the benefit of Japanese Application Nos. 2007-011591, filed on Jan. 22, 2007 and 2007-056057, filed on Mar. 6, 2007, the disclosures of which Applications are incorporated by reference herein.

TECHNICAL FIELD

The present invention relates to a membrane-membrane reinforcing member assembly, a membrane-catalyst layer assembly, a membrane-electrode assembly, and a polymer electrolyte fuel cell, and particularly to the configuration of a membrane-membrane reinforcing member assembly.

BACKGROUND ART

A fuel cell causes a hydrogen-containing fuel gas and an oxygen-containing oxidizing gas, such as air, to electrochemically react with each other to generate electric power and heat at the same time. The hydrogen-containing fuel gas is obtained by reforming a material gas, such as a city gas. A unit cell (cell) of the fuel cell includes: an MEA (Membrane-Electrode-Assembly) constituted by a polymer electrolyte membrane and a pair of gas diffusion electrodes; gaskets; and electrically conductive separators. A groove-like gas channel through which the fuel gas or the oxidizing gas (each of these gases is referred to as "reactant gas") flows is formed on a main surface of the separator which surface contacts the gas diffusion electrode. The gaskets are disposed around a peripheral portion of the MEA, and the pair of separators sandwich the MEA. Thus, the cell is formed.

A common fuel cell is so-called a stack-type fuel cell in which the cells are stacked on and fastened to one another, and adjacent MEAs are electrically connected to each other in series. When manufacturing the cell stack, the stacked cells are sandwiched between end plates, and the end plates and the cells are fastened by fasteners. Therefore, the polymer electrolyte membrane needs to have an adequate strength so as to be able to endure the fastening pressure and not to be physically damaged by, for example, abrasion in a long-period use.

To such needs, known is a seal structure of a solid polymer electrolyte fuel cell in which a frame-shaped protective membrane is attached to the polymer electrolyte membrane (see Patent Document 1 for example).

FIG. 9 is a schematic diagram showing an outline of the seal structure of the solid polymer electrolyte fuel cell disclosed in Patent Document 1.

As shown in FIG. 9, a frame-shaped protective membrane 220 formed by a fluorocarbon resin-based sheet is disposed on a main surface of a solid polymer electrolyte membrane 210 such that an inner peripheral portion thereof is covered with an electrode 213. In addition, a gas sealing material 212 is disposed to surround the electrode 213 such that a gap 214 is formed between the gas sealing material 212 and the electrode 213. With this, since the protective membrane 220 is sandwiched between the gas sealing material 212 and the solid polymer electrolyte membrane 210 and between the electrode 213 and the solid polymer electrolyte membrane 210, and the protective membrane 220 reinforces the solid polymer electrolyte membrane 210 at the gap 214, the damage of the solid polymer electrolyte membrane 210 can be prevented without increasing the thickness of the solid polymer electrolyte membrane 210.

Patent Document 1: Japanese Laid-Open Patent Application Publication 5-21077

DISCLOSURE OF THE INVENTION

Problems to be Solved by the Invention

However, in the case of the seal structure of the solid polymer electrolyte fuel cell disclosed in Patent Document 1, to form the frame-shaped protective membrane 220, a center portion of the fluorocarbon resin sheet having a substantially rectangular shape needs to be punched out. This deteriorates the yield of the protective membrane 220. Therefore, to further reduce the cost for manufacturing the fuel cell, there is still room for improvement.

The present invention was made in view of the above problems, and an object of the present invention is to provide a membrane-membrane reinforcing member assembly, a membrane-catalyst layer assembly, a membrane-electrode assembly, and a polymer electrolyte fuel cell, each capable of securing adequate durability and each having a configuration suitable for the cost reduction of the fuel cell.

Means for Solving the Problems

In order to solve the above problems, a membrane-membrane reinforcing member assembly according to the present invention includes: a polymer electrolyte membrane having a substantially quadrilateral shape; a membrane-like first membrane reinforcing member disposed on a first main surface of the polymer electrolyte membrane to bend at a substantially right angle at a corner of the polymer electrolyte membrane and extend along sides forming the corner; and a membrane-like second membrane reinforcing member disposed on a second main surface of the polymer electrolyte membrane to bend at a substantially right angle at a corner of the polymer electrolyte membrane and extend along sides forming the corner, wherein the first membrane reinforcing member and the second membrane reinforcing member are disposed to extend along four sides of the polymer electrolyte membrane as a whole.

As described above, since the membrane reinforcing member having a substantially L shape is used in the membrane-membrane reinforcing member assembly according to the present invention, the above-described punched-out portion does not exist as in the frame-shaped protective membrane 220 of the fuel cell disclosed in Patent Document 1. Therefore, the membrane-membrane reinforcing member assembly can be manufactured at low cost.

Moreover, in the membrane-membrane reinforcing member assembly according to the present invention, a pair of the first membrane reinforcing members may be disposed at one pair of corners, respectively, of the polymer electrolyte membrane on the first main surface of the polymer electrolyte membrane; a pair of the second membrane reinforcing members may be disposed at the other pair of corners, respectively, of the polymer electrolyte membrane on the second main surface of the polymer electrolyte membrane; and the pair of the first membrane reinforcing members and the pair of the second membrane reinforcing members may be disposed so as not to overlap one another when viewed from a thickness direction of the polymer electrolyte membrane.

Moreover, in the membrane-membrane reinforcing member assembly according to the present invention, the pair of the first membrane reinforcing members may be disposed to bend at one pair of adjacent corners, respectively, of the polymer electrolyte membrane, and the pair of the second membrane reinforcing members may be disposed to bend at the other pair of adjacent corners, respectively, of the polymer electrolyte membrane.

Moreover, in the membrane-membrane reinforcing member assembly according to the present invention, the pair of the first membrane reinforcing members may be disposed to bend at one pair of opposed corners, respectively, of the polymer electrolyte membrane, and the pair of the second membrane reinforcing members may be disposed to bend at the other pair of opposed corners, respectively, of the polymer electrolyte membrane.

Moreover, in the membrane-membrane reinforcing member assembly according to the present invention, the polymer electrolyte membrane may be bent such that: a main surface of the first membrane reinforcing member which surface does not contact the polymer electrolyte membrane and a portion of the first main surface on which portion the first membrane reinforcing member is not disposed are flush with each other as a whole; and a main surface of the second membrane reinforcing member which surface does not contact the polymer electrolyte membrane and a portion of the second main surface on which portion the second membrane reinforcing member is not disposed are flush with each other as a whole.

With this, the difference between the pressure applied, when fastening the fuel cell, to a portion of the first main surface of the polymer electrolyte membrane of the membrane-membrane reinforcing member assembly on which portion the first membrane reinforcing member is not disposed and the pressure applied, when fastening the fuel cell, to the main surface of the first membrane reinforcing member which surface does not contact the polymer electrolyte membrane can be reduced. In addition, the difference between the pressure applied, when fastening the fuel cell, to a portion of the second main surface of the polymer electrolyte membrane on which portion the second membrane reinforcing member is not disposed and the pressure applied, when fastening the fuel cell, to the main surface of the second membrane reinforcing member which surface does not contact the polymer electrolyte membrane can be reduced. Further, since the difference between the above pressures can be reduced, the damage of the membrane-membrane reinforcing member assembly can be reduced.

Moreover, in the membrane-membrane reinforcing member assembly according to the present invention, the polymer electrolyte membrane may include an inner reinforcing membrane having therein a through hole that serves as an ion conduction path.

With this, the mechanical strength of the entire polymer electrolyte membrane can be increased. Moreover, even if the polymer electrolyte membrane is damaged, cross leakage of the reactant gas can be surely prevented by the inner reinforcing membrane.

Moreover, a membrane-catalyst layer assembly according to the present invention includes: the above-described membrane-membrane reinforcing member assembly; a first catalyst layer disposed to cover the first main surface of the polymer electrolyte membrane; and a second catalyst layer disposed to cover the second main surface of the polymer electrolyte membrane, wherein the first catalyst layer and the second catalyst layer are disposed such that peripheral portions thereof overlap the first membrane reinforcing member and the second membrane reinforcing member, respectively, over an entire periphery when viewed in a thickness direction of the polymer electrolyte membrane.

As described above, in the membrane-catalyst layer assembly according to the present invention, the end portion of the catalyst layer which portion applies the highest pressure to the polymer electrolyte membrane when fastening the fuel cell contacts the membrane reinforcing member (the membrane reinforcing member is interposed between the end portion of the catalyst layer and the polymer electrolyte membrane). Therefore, the damage of the polymer electrolyte membrane can be prevented. Moreover, even if a portion of one main surface of the polymer electrolyte membrane which portion contacts the end portion of the catalyst layer is damaged, the cross leakage of the reactant gas can be prevented since the membrane reinforcing member is disposed on a portion of the other main surface which portion corresponds to the damaged portion.

Moreover, since the membrane-catalyst layer assembly according to the present invention includes the above-described membrane-membrane reinforcing member assembly according to the present invention, further cost reduction can be easily realized.

As above, the membrane-catalyst layer assembly according to the present invention can easily realize further cost reduction and further productivity improvement while securing adequate durability.

Moreover, a membrane-electrode assembly according to the present invention includes: the above-described membrane-catalyst layer assembly; a first gas diffusion layer disposed to cover the first catalyst layer of the membrane-catalyst layer assembly; and a second gas diffusion layer disposed to cover the second catalyst layer of the membrane-catalyst layer assembly.

Further, a polymer electrolyte fuel cell according to the present invention includes the above-described membrane-electrode assembly.

With this, since the polymer electrolyte fuel cell according to the present invention includes the above-described membrane-electrode assembly according to the present invention, further cost reduction and further productivity improvement can be easily realized.

The above object, other objects, features and advantages of the present invention will be made clear by the following detailed explanation of preferred embodiments with reference to the attached drawings.

Effects of the Invention

According to the membrane-membrane reinforcing member assembly, the membrane-catalyst layer assembly, the membrane-electrode assembly, and the polymer electrolyte fuel cell of the present invention, it is possible to provide a membrane-membrane reinforcing member assembly, a membrane-catalyst layer assembly, a membrane-electrode assembly, and a polymer electrolyte fuel cell each capable of securing adequate durability and each suitable for cost reduction and mass production.

BRIEF DESCRIPTION OF THE DRAWINGS

FIG. 2(a) is a perspective view schematically showing a state where a first membrane reinforcing member and a second membrane reinforcing member are disposed on a polymer electrolyte membrane of the cell of the PEFC shown in FIG. 1.

FIG. 2(c) is a perspective view schematically showing a schematic configuration of the membrane-membrane reinforcing member assembly of the cell of the PEFC shown in FIG. 1.

FIG. 3(b) is a schematic diagram when viewed from a direction indicated by an arrow IIIB shown in FIG. 3(a).

FIG. 8 is a schematic diagram showing a schematic configuration of an inner reinforcing membrane of a polymer electrolyte membrane-inner reinforcing membrane complex in the cell shown in FIG. 7.

Figure 1:
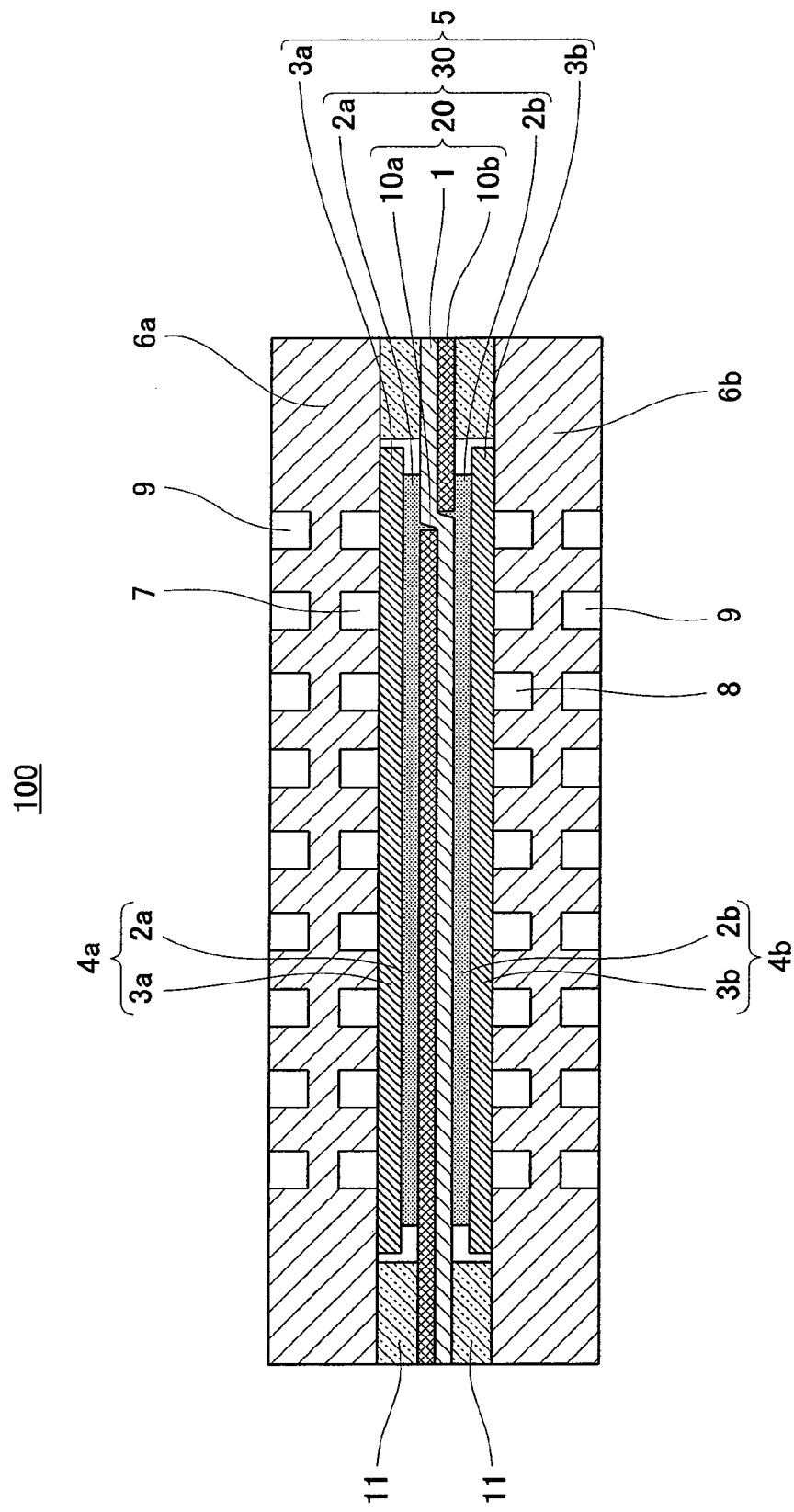
FIG. 1 is a cross-sectional view schematically showing a schematic configuration of a cell of a polymer electrolyte fuel cell according to Embodiment 1 of the present invention.

EXPLANATION OF REFERENCE NUMBERS 1 polymer electrolyte membrane
2 catalyst layer
2a anode catalyst layer
2b cathode catalyst layer
3 gas diffusion layer
3a anode gas diffusion layer
3b cathode gas diffusion layer
4 electrode
4a anode
4b cathode
5 MEA (membrane-electrode assembly)
6a anode separator
6b cathode separator
7 fuel gas channel
8 oxidizing gas channel
9 heat medium channel
10a first membrane reinforcing member
10b second membrane reinforcing member
11 gasket
12 gap
12a gap
12b gap
13 bent portion
15 polymer electrolyte membrane-inner reinforcing membrane complex
15a polymer electrolyte membrane
15b polymer electrolyte membrane
15c inner reinforcing membrane
16 opening
20 membrane-membrane reinforcing member assembly
30 membrane-catalyst layer assembly
40 polymer electrolyte membrane roll
41 polymer electrolyte membrane sheet
42 membrane-membrane reinforcing member stack body
43 membrane-membrane reinforcing member assembly sheet
44 membrane-catalyst layer sheet
45 membrane-catalyst layer assembly sheet
47 mask
48 opening
49 catalyst layer forming device
60 membrane reinforcing member sheet
80 heat press
81 roller
100 cell
210 solid polymer electrolyte membrane
212 gas sealing material
213 electrode
214 gap
220 protective membrane
222 opening
252 protective membrane sheet
D1 proceeding direction
C1 corner portion (corner)
C2 corner portion (corner)
C3 corner portion (corner)
C3' corner portion
C4 corner portion (corner)
C4' corner portion
E1 side E2 side
E3 side
E4 side
E5 side
E6 side
E7 side
E8 side
F10 main surface
F20 main surface
P1 bonding step
P2 pressing step
P3 first applying step
P4 second applying step
P5 cutting step

BEST MODE FOR CARRYING OUT THE INVENTION

Hereinafter, preferred embodiments of the present invention will be explained in reference to the drawings. In the drawings, same reference numbers are used for the same or corresponding parts, and a repetition of the same explanation is avoided.

Embodiment 1

FIG. 1 is a cross-sectional view schematically showing a schematic configuration of a cell of a polymer electrolyte fuel cell (hereinafter referred to as "PEFC") according to Embodiment 1 of the present invention.

As shown in FIG. 1, a cell 100 of the PEFC according to Embodiment 1 includes an MEA (membrane-electrode assembly) 5, a first membrane reinforcing member 10a, a second membrane reinforcing member 10b, gaskets 11, an anode separator 6a, and a cathode separator 6b. The MEA 5 includes: a polymer electrolyte membrane 1 which selectively transports hydrogen ions; an anode 4a formed by an anode catalyst layer (first catalyst layer) 2a and an anode gas diffusion layer (first gas diffusion layer) 3a; and a cathode 4b formed by a cathode catalyst layer (second catalyst layer) 2b and a cathode gas diffusion layer (second gas diffusion layer) 3b. Herein, an assembly formed by the polymer electrolyte membrane 1, the first membrane reinforcing member 10a, and the second membrane reinforcing member 10b is referred to as a membrane-membrane reinforcing member assembly 20, and an assembly formed by the membrane-membrane reinforcing member assembly 20, the anode catalyst layer 2a, and the cathode catalyst layer 2b is referred to as a membrane-catalyst layer assembly 30.

First, the membrane-membrane reinforcing member assembly 20 will be explained.

Figure 2B:
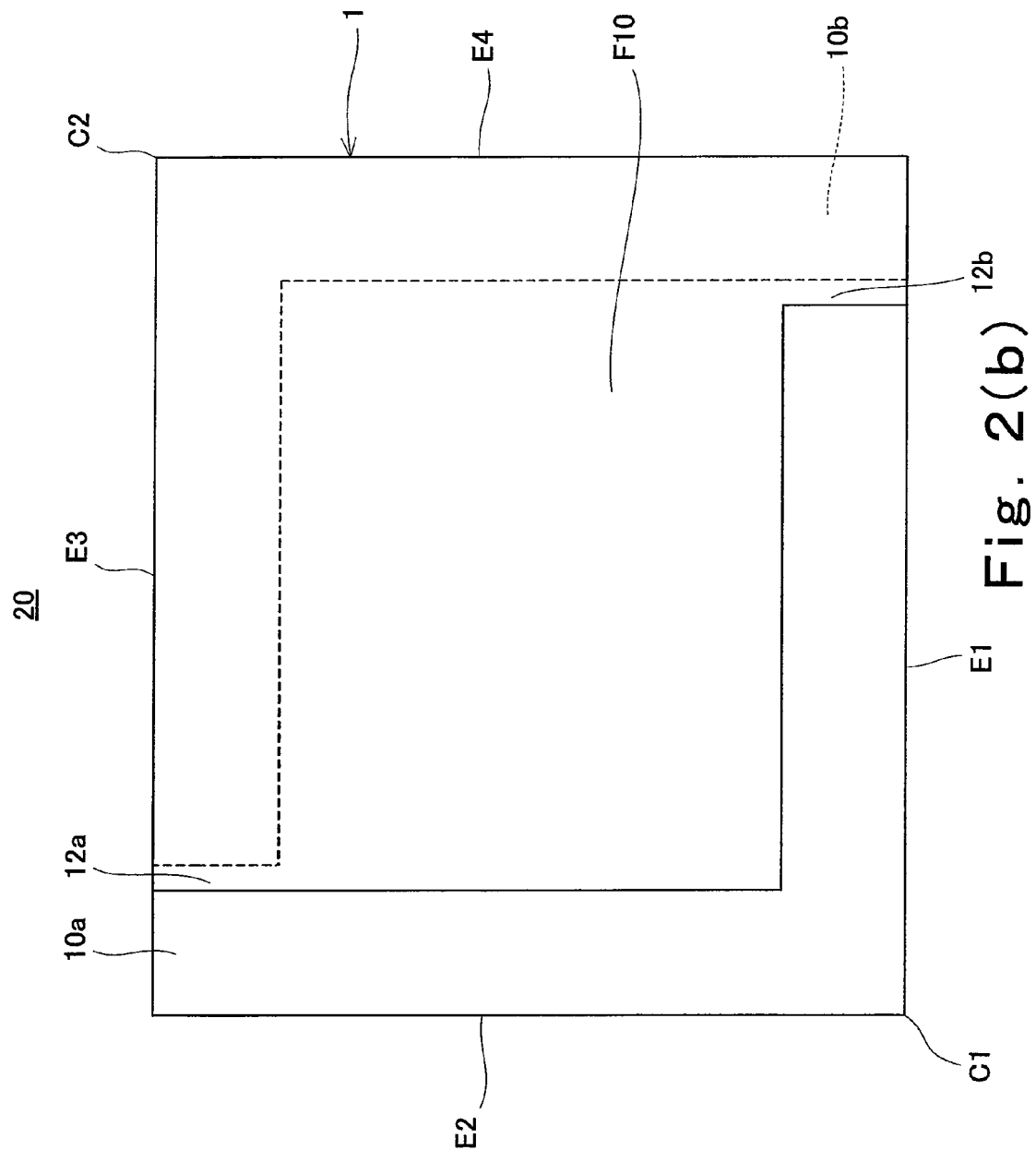
FIG. 2(b) is a schematic diagram showing a membrane-membrane reinforcing member assembly when viewed from a direction indicated by an arrow JIB in FIG. 2(a).

FIG. 2(a) is a perspective view schematically showing a state where the first membrane reinforcing member 10a and the second membrane reinforcing member 10b are disposed on the polymer electrolyte membrane 1 of the cell 100 of the PEFC shown in FIG. 1. FIG. 2(b) is a schematic diagram showing the membrane-membrane reinforcing member assembly 20 when viewed from a direction indicated by an arrow IIB in FIG. 2(a). FIG. 2(c) is a perspective view schematically showing a schematic configuration of the membrane-membrane reinforcing member assembly 20 of the cell 100 of the PEFC shown in FIG. 1.

As shown in FIG. 2(a), the polymer electrolyte membrane 1 is formed in a substantially quadrilateral shape (herein, rectangular shape) having sides E1 to E4, and has a first main surface F10 and a second main surface F20 which are opposed to each other. The first membrane reinforcing member 10a having a film shape and a substantially L shape is disposed on the first main surface F10 such that a corner portion thereof coincides with a corner portion C1 of the polymer electrolyte membrane 1. The second membrane reinforcing member 10b having a film shape and a substantially L shape is disposed on the second main surface F20 such that a corner portion thereof coincides with a corner portion C2 of the polymer electrolyte membrane 1.

Specifically, a long portion of the first membrane reinforcing member 10a extends along the side E2 on the first main surface F10, and a short portion of the first membrane reinforcing member 10a extends along the side E1 on the first main surface F10. Moreover, a long portion of the second membrane reinforcing member 10b extends along the side E4 on the second main surface F20, and a short portion of the second membrane reinforcing member 10b extends along the side E3 on the second main surface F20.

As shown in FIG. 2(b), when viewed from a thickness direction of the polymer electrolyte membrane 1, the first membrane reinforcing member 10a and the second membrane reinforcing member 10b are disposed on the first main surface F10 and the second main surface F20, respectively, such that a gap 12a is formed between an end surface of the short portion of the first membrane reinforcing member 10a and the long portion of the second membrane reinforcing member 10b, and a gap 12b is formed between an end surface of the short portion of the second membrane reinforcing member 10b and the long portion of the first membrane reinforcing member 10a. The length of each of the gaps 12a and 12b is slightly larger than the thickness of each of the first membrane reinforcing member 10a and the second membrane reinforcing member 10b. As above, the first membrane reinforcing member 10a and the second membrane reinforcing member 10b are disposed to extend along four sides of the polymer electrolyte membrane 1 as a whole and surround a peripheral portion of the polymer electrolyte membrane 1.

Then, the first and second membrane reinforcing members 10a and 10b are disposed on the polymer electrolyte membrane 1 as described above, and these members 1, 10a, and 10b are pressed by a pressing means as described below to bend the polymer electrolyte membrane 1. Thus, the membrane-membrane reinforcing member assembly 20 is formed.

As shown in FIG. 2(c), the polymer electrolyte membrane 1 of the bent membrane-membrane reinforcing member assembly 20 is bent such that: a main surface (hereinafter referred to as "front surface") of the first membrane reinforcing member 10a which surface does not contact the polymer electrolyte membrane 1 and a portion of the first main surface F10 on which portion the first membrane reinforcing member 10a is not disposed are flush with each other as a whole; and a main surface (hereinafter referred to as "front surface") of the second membrane reinforcing member 10b which surface does not contact the polymer electrolyte membrane 1 and a portion of the second main surface F20 on which portion the second membrane reinforcing member 10b is not disposed are flush with each other as a whole. Since the polymer electrolyte membrane 1 is bent as above, a bent portion 13 is formed at each of the gaps 12a and 12b.

It is preferable that the polymer electrolyte membrane 1 have extensibility so as to be able to bend as above. Moreover, the thickness of the first membrane reinforcing member 10a, the thickness of the second membrane reinforcing member 10b, the width and length of the long portion, and the width and length of the short portion are not especially limited as long as the effects of the present invention can be obtained. However, to more surely obtain the effects of the present invention, it is preferable that the thicknesses of the first membrane reinforcing member 10a be the same as that of the second membrane reinforcing member 10b, the width and length of the long portion of the first membrane reinforcing member 10a be respectively the same as those of the long portion of the second membrane reinforcing member 10b, and the width and length of the short portion of the first membrane reinforcing member 10a be respectively the same as those of the short portion of the second membrane reinforcing member 10b. Herein, the length of the long portion of the first membrane reinforcing member 10a is set to be the same as the length of the side E2 of the polymer electrolyte membrane 1, and the length of the long portion of the second membrane reinforcing member 10b is set to be the same as the length of the side E4 of the polymer electrolyte membrane 1. However, the present embodiment is not limited to this. As will be described below, the length of the long portion is not limited as long as the catalyst layers 2 respectively overlap the first and second membrane reinforcing members 10a and 10b over the entire periphery when viewed from the thickness direction of the polymer electrolyte membrane 1.

Next, respective components of the membrane-membrane reinforcing member assembly 20 will be explained.

The polymer electrolyte membrane 1 has proton conductivity. It is preferable that the polymer electrolyte membrane 1 include a sulfonic acid group, a carboxylic acid group, a phosphonic acid group, or a sulfonimide group, as a positive ion exchange group. In view of the proton conductivity, it is especially preferable that the polymer electrolyte membrane 1 include the sulfonic acid group.

As resin which constitutes the polymer electrolyte membrane 1 and contains the sulfonic acid group, dry resin having the ion exchange capacity of 0.5 to 1.5 meq/g is preferable. It is preferable that the ion exchange capacity of the dry resin constituting the polymer electrolyte membrane 1 be 0.5 meq/g or more, since the increase in the resistance value of the polymer electrolyte membrane 1 at the time of power generation can be adequately decreased, and it is preferable that the ion exchange capacity of the dry resin be 1.5 meq/g or less, since the water content of the polymer electrolyte membrane 1 does not increase, the polymer electrolyte membrane 1 hardly swell, and fine holes of the below-described catalyst layer 2 do not clog. From the same viewpoint as above, it is more preferable that the ion exchange capacity of the dry resin be 0.8 to 1.2 meq/g.

It is preferable that the polymer electrolyte be a copolymer containing a polymerization unit based on a perfluorovinyl compound expressed by $CF_2=CF-(OCF_2CFX)_m-O_p-(CF_2)_n-SO_3H$ (m is an integer from 0 to 3, n is an integer from 1 to 12, p is 0 or 1, and X is a fluorine atom or a trifluoromethyl group), and a polymerization unit based on tetrafluoroethylene.

Preferable examples of the above fluorovinyl compound are compounds expressed by Formulas (4) to (6) below. In the following formulas, q is an integer from 1 to 8, r is an integer from 1 to 8, and t is an integer from 1 to 3.

$$CF_2=CFO(CF_2)_q-SO_3H \quad (4)$$

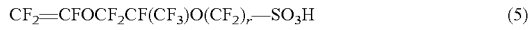

$$CF_2=CFOCF_2CF(CF_3)O(CF_2)_r-SO_3H \quad (5)$$

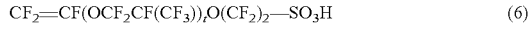

$$CF_2=CF(OCF_2CF(CF_3))_tO(CF_2)_2-SO_3H \quad (6)$$

Moreover, it is preferable that a constituent material of each of the first membrane reinforcing members 10a and the second membrane reinforcing members 10b be synthetic resin having bendability and flexibility such that each of the first membrane reinforcing members 10a and the second membrane reinforcing members 10b can be rolled at the time of manufacturing and can be unrolled to return to an original shape.

Further, it is preferable that the above synthetic resin be synthetic resin made of at least one resin selected from the group consisting of polyethylene naphthalate, polytetrafluoroethylene, polyethylene terephthalate, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Next, the membrane-catalyst layer assembly 30 will be explained.

Figure 3A:
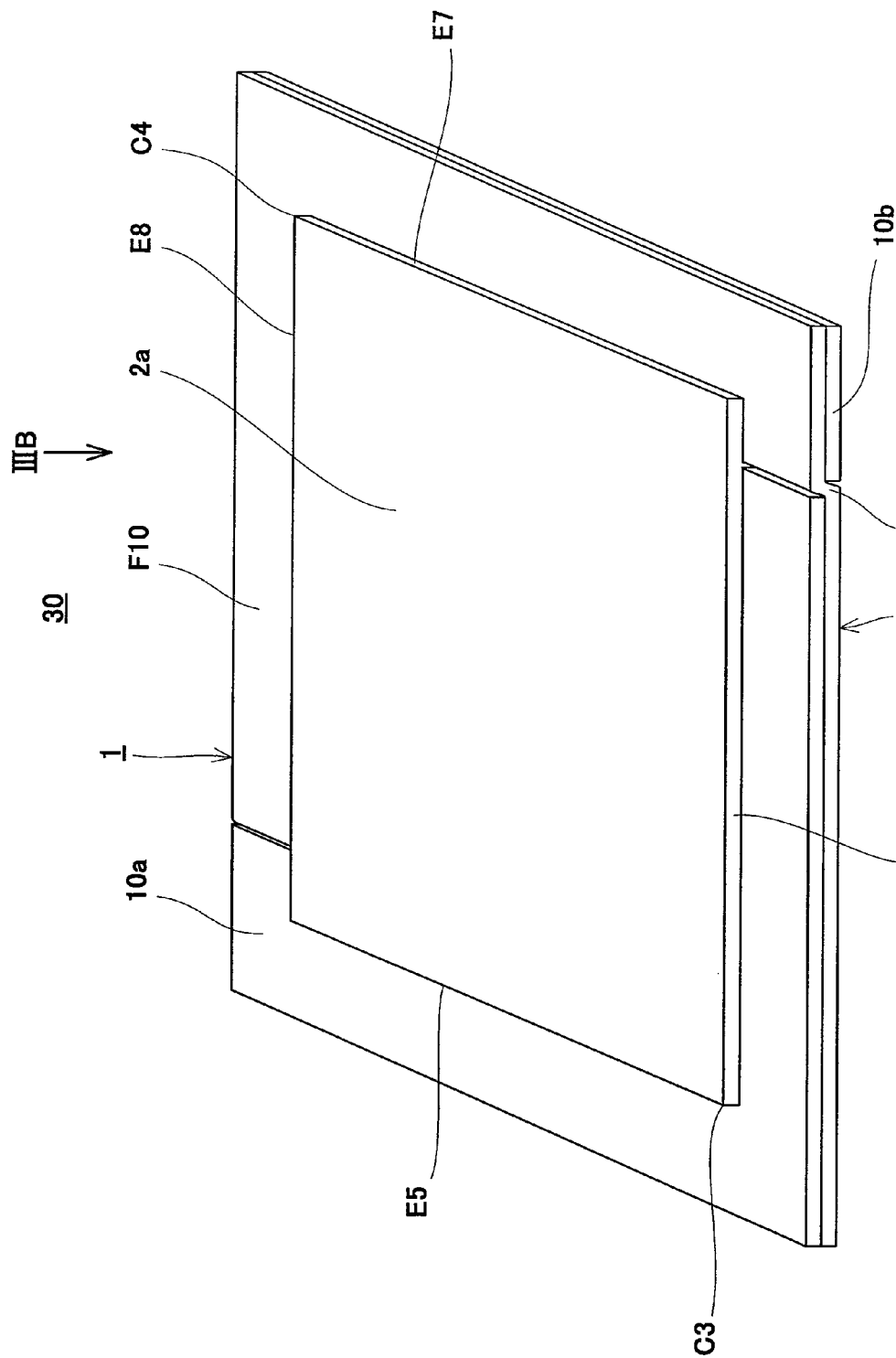
FIG. 3(a) is a perspective view schematically showing a schematic configuration of a membrane-catalyst layer assembly in the cell of the polymer electrolyte fuel cell shown in FIG. 1.

FIG. 3(a) is a perspective view schematically showing a schematic configuration of the membrane-catalyst layer assembly 30 in the cell 100 of the PEFC shown in FIG. 1. FIG. 3(b) is a schematic diagram when viewed from a direction indicated by an arrow IIIB shown in FIG. 3(a).

As shown in FIGS. 3(a) and 3(b), the membrane-catalyst layer assembly 30 includes the membrane-membrane reinforcing member assembly 20 and the catalyst layers 2 (the anode catalyst layer 2a and the cathode catalyst layer 2b). The anode catalyst layer 2a is disposed to cover a portion of the first main surface F10 of the polymer electrolyte membrane 1 on which portion the first membrane reinforcing member 10a is not disposed, and the front surface of the first membrane reinforcing member 10a. Moreover, the cathode catalyst layer 2b is disposed to cover a portion of the second main surface F20 of the polymer electrolyte membrane 1 on which portion the second membrane reinforcing member 10b is not disposed, and the front surface of the second membrane reinforcing member 10b.

As shown in FIG. 3(b), herein, the anode catalyst layer 2a and the cathode catalyst layer 2b are formed in a rectangular shape similar to the shape of the polymer electrolyte membrane 1, and are disposed such that peripheral portions thereof overlap the first membrane reinforcing member 10a and the second membrane reinforcing member 10b, respectively, over the entire periphery when viewed from the thickness direction (direction indicated by the arrow IIIB) of the polymer electrolyte membrane 1.

With this, since sides E5 and E6 forming a corner portion C3 of the anode catalyst layer 2a contact the first membrane reinforcing member 10a but do not directly contact the first main surface F10 of the polymer electrolyte membrane 1, the polymer electrolyte membrane 1 is not damaged. Similarly, since sides E7 and E8 forming a corner portion C4' opposed to a corner portion C3' of the cathode catalyst layer 2b contact the second membrane reinforcing member 10b but do not directly contact the second main surface F20 of the polymer electrolyte membrane 1, the polymer electrolyte membrane 1 is not damaged.

In contrast, since the sides E7 and E8 forming a corner portion C4 of the anode catalyst layer 2a directly contact the first main surface F10 of the polymer electrolyte membrane 1, the polymer electrolyte membrane 1 may be damaged at this contact portion. However, even in this case, since the second membrane reinforcing member 10b is disposed at a portion of the second main surface F20 of the polymer electrolyte membrane 1 which portion corresponds to the contact portion, cross leakage of the reactant gas does not occur. Similarly, since the sides E5 and E6 forming the corner portion C3' of the cathode catalyst layer 2b directly contact the second main surface F20 of the polymer electrolyte membrane 1, the polymer electrolyte membrane 1 may be damaged at this contact portion. Even in this case, since the first membrane reinforcing member 10a is disposed at a portion of the first main surface F10 of the polymer electrolyte membrane 1 which portion corresponds to the contact portion, the cross leakage of the reactant gas does not occur. Further, the first membrane reinforcing member 10a and the second membrane reinforcing member 10b are not disposed at the bent portion 13 where the polymer electrolyte membrane 1 is bent. However, as shown in FIG. 3(a), the bent portion 13 is formed to be thicker than the other portions of the polymer electrolyte membrane 1. Therefore, even if an end portion of the catalyst layer 2 directly contacts the bent portion 13, the polymer electrolyte membrane 1 is not damaged.

The configuration of the catalyst layer 2 is not especially limited as long as the effects of the present invention can be obtained. The catalyst layer 2 may have the same configuration as a catalyst layer of a gas diffusion electrode of a known fuel cell. For example, the catalyst layer 2 may be configured to contain electrically-conductive carbon particles (powder) supporting electrode catalyst and a polymer electrolyte having positive ion (hydrogen ion) conductivity, or may be configured to further contain a water-repellent material, such as polytetrafluoroethylene. The anode catalyst layer 2a and the cathode catalyst layer 2b may be the same in configuration as each other or may be different in configuration from each other.

The catalyst layer 2 may be formed by using a method for manufacturing the catalyst layer of the gas diffusion electrode of the known fuel cell. For example, the catalyst layer 2 may be formed by preparing and using a liquid (catalyst layer forming ink) containing at least a constituent material (for example, the electrically-conductive carbon particle supporting the electrode catalyst, and the polymer electrolyte) of the catalyst layer 2 and a dispersion medium.

The polymer electrolyte may be the same as or different from the material of the above-described polymer electrolyte membrane 1. As the electrode catalyst, it is possible to use a metallic particle. The metallic particle is not especially limited, and various metals can be used. However, in light of an electrode reaction activity, it is preferable that the metallic particle be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these, platinum or an alloy of platinum and at least one metal selected from the above group is preferable, and an alloy of platinum and ruthenium is especially preferable since the activity of the catalyst becomes stable in the anode catalyst layer 2a.

Moreover, it is preferable that an average diameter of the metallic particles of the electrode catalyst be 1 to 5 nm. The electrode catalyst having the average diameter of 1 nm or more is preferable since it is industrially easy to prepare such electrode catalyst. Moreover, the electrode catalyst having the average diameter of 5 nm or less is preferable since it becomes easy to more adequately secure the activity per unit mass of the electrode catalyst and this leads to the cost reduction of the fuel cell.

It is preferable that a specific surface area of the electrically-conductive carbon particle be 50 to 1500 $m^2/g$. The specific surface area of 50 $m^2/g$ or more is preferable since a supporting rate of the electrode catalyst can be easily increased, and an output characteristics of the obtained catalyst layer 2 can be more adequately secured. Moreover, the specific surface area of 1500 $m^2/g$ or less is preferable since adequate-size fine holes can be more easily secured, covering by the polymer electrolyte can be more easily carried out, and the output characteristics of the catalyst layer 2 can be more adequately secured. From the same viewpoint as above, it is more preferable that the specific surface area be 200 to 900 $m^2/g$.

Moreover, it is preferable that the average diameter of the electrically-conductive carbon particle be 0.1 to 1.0 μm. The average diameter of 0.1 μm or more is preferable since it becomes easy to more adequately secure the gas diffusivity in the catalyst layer 2, and flooding can be more surely prevented. Moreover, the average diameter of 1.0 μm or less is preferable since it becomes easy to more easily make the covering state of the electrode catalyst by the polymer electrolyte satisfactory, and it becomes easy to more adequately secure the covering area of the electrode catalyst by the polymer electrolyte, thereby being able to more easily secure adequate electrode performance.

Next, the MEA (membrane-electrode assembly) 5 will be explained.

Figure 4A:
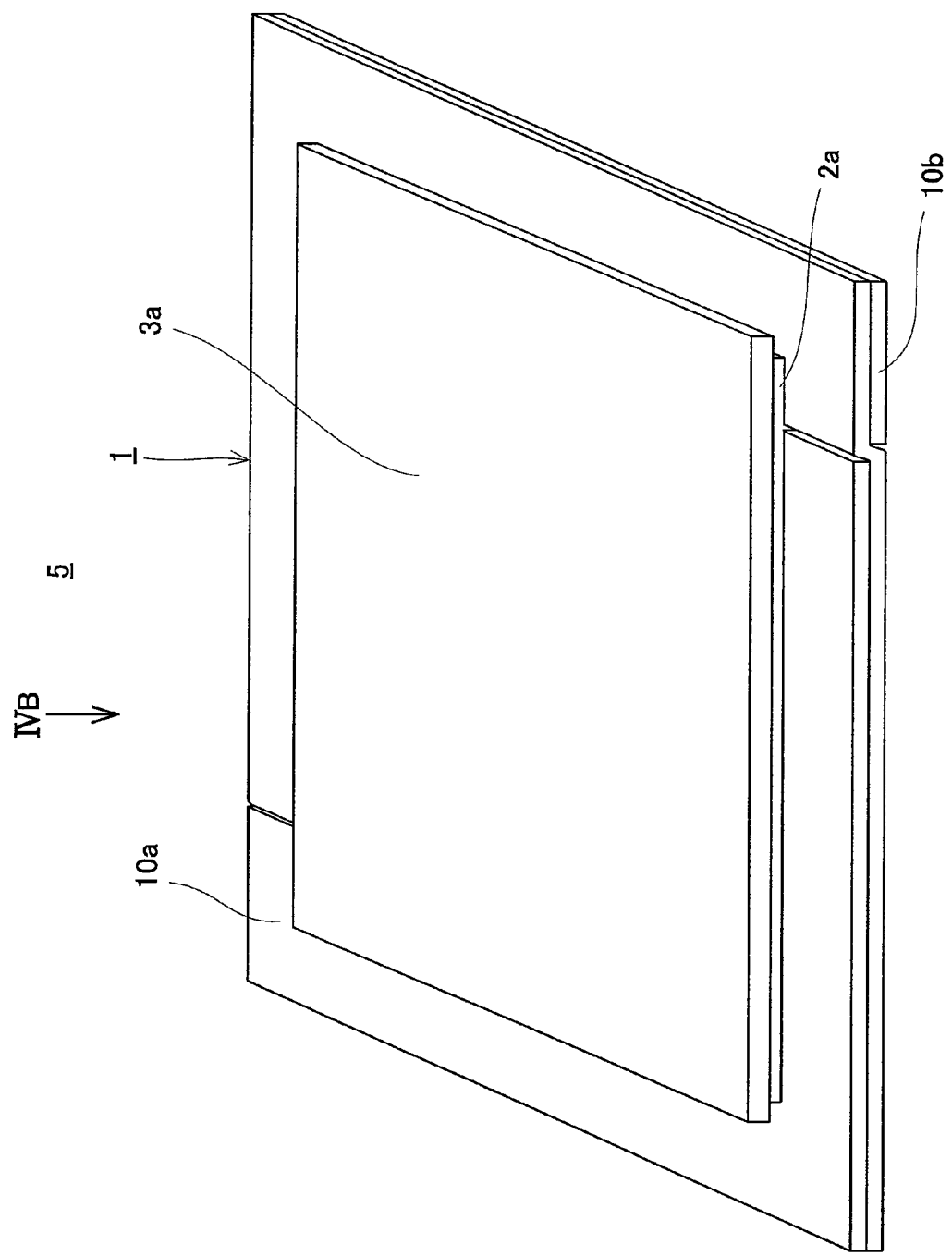
FIG. 4(a) is a schematic diagram showing a schematic configuration of an MEA in the cell of the polymer electrolyte fuel cell shown in FIG. 1.
Figure 4B:
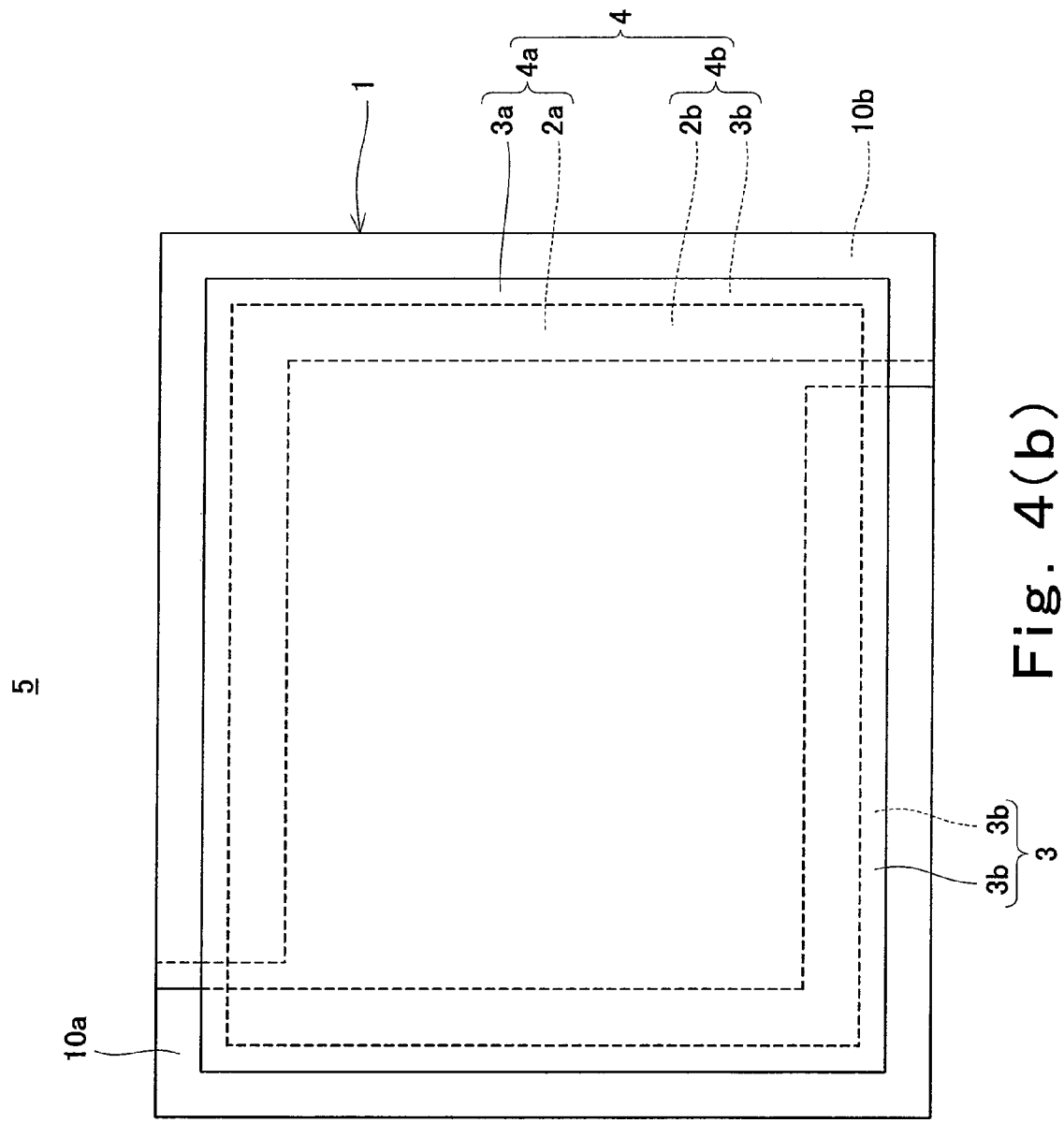
FIG. 4(b) is a schematic diagram when viewed from a direction indicated by an arrow IVB shown in FIG. 4(a).

FIG. 4(a) is a schematic diagram showing a schematic configuration of the MEA 5 in the cell 100 of the PEFC shown in FIG. 1. FIG. 4(b) is a schematic diagram showing the MEA 5 when viewed from a direction indicated by an arrow IVB shown in FIG. 4(a).

As shown in FIGS. 4(a) and 4(b), in the MEA 5, the anode gas diffusion layer 3a having a plate shape is disposed to cover the main surface of the anode catalyst layer 2a of the membrane-catalyst layer assembly 30, and similarly, the cathode gas diffusion layer 3b having a plate shape is disposed to cover the main surface of the cathode catalyst layer 2b of the membrane-catalyst layer assembly 30. The anode catalyst layer 2a and the anode gas diffusion layer 3a constitute the anode 4a, and the cathode catalyst layer 2b and the cathode gas diffusion layer 3b constitute the cathode 4b. Moreover, the anode 4a and the cathode 4b constitute an electrode 4. Herein, the main surface of the anode gas diffusion layer 3a and the main surface of the cathode gas diffusion layer 3b are configured to be larger than the main surface of the anode catalyst layer 2a and the main surface of the cathode catalyst layer 2b, respectively. However, the present embodiment is not limited to this, and the main surfaces may be the same in size as each other.

The configuration of each of the anode gas diffusion layer 3a and the cathode gas diffusion layer 3b (hereinafter referred to as "gas diffusion layers 3") is not especially limited as long as the effects of the present invention can be obtained. Each of the anode gas diffusion layer 3a and the cathode gas diffusion layer 3b may have the same configuration as a gas diffusion layer of the gas diffusion electrode of the known fuel cell. Moreover, the gas diffusion layers 3 may be the same in configuration as each other or different in configuration from each other.

For example, in order that the gas diffusion layer 3 has gas permeability, an electrically-conductive base material having a porous structure, which is manufactured using high surface area carbon fine powder, pore-forming material, carbon paper, carbon cloth, or the like, may be used as the gas diffusion layer 3. Moreover, in order to obtain adequate drainage property, for example, water-repellent polymer, typically fluorocarbon resin, may be dispersed in the gas diffusion layer 3. Further, in order to obtain adequate electron conductivity, the gas diffusion layer 3 may be formed by an electron conductive material, such as carbon fiber, metal fiber, or carbon fine powder.

Moreover, a water-repellent carbon layer formed by water-repellent polymer and carbon powder may be disposed between the anode gas diffusion layer 3a and the anode catalyst layer 2a, and between the cathode gas diffusion layer 3b and the cathode catalyst layer 2b. With this, water control in the MEA 5 (retention of water necessary for maintaining satisfactory properties of the MEA 5, and quick discharge of unnecessary water) can be carried out more easily and more surely.

Next, the other components of the cell 100 will be explained.

As shown in FIG. 1, a pair of frame-shaped gaskets 11 made of fluorocarbon rubber are disposed around the anode 4*a* and the cathode 4*b*, respectively, of the MEA 5 configured as above so as to sandwich the polymer electrolyte membrane 1. This prevents the fuel gas, the air, and the oxidizing gas from leaking to an outside of the cell, and prevents these gases from being mixed with each other in the cell 100. Manifold holes (not shown), such as a fuel gas supplying manifold hole, formed by through holes extending in the thickness direction are formed on a peripheral portion of each of the polymer electrolyte membrane 1, the first and second membrane reinforcing members 10*a* and 10*b*, and the gaskets 11.

Moreover, the anode separator 6*a* and the cathode separator 6*b* both of which are electrically conductive are disposed to sandwich the MEA 5 and the gaskets 11. Used as each of these separators 6*a* and 6*b* is a resin-impregnated graphite plate obtained by impregnating a graphite plate with phenol resin and hardening the graphite plate. Moreover, a separator made of a metallic material, such as SUS, may be used as each of the separators 6*a* and 6*b*. The MEA 5 is mechanically fixed by the anode separator 6*a* and the cathode separator 6*b*, and adjacent MEAs 5 are electrically connected to each other in series.

A groove-like fuel gas channel 7 through which the fuel gas flows is formed in a serpentine shape on an inner surface (surface contacting the MEA 5) of the anode separator 6*a*. Meanwhile, a groove-like heat medium channel 9 through which a heat medium flows is formed in a serpentine shape on an outer surface of the anode separator 6*a*. Moreover, the manifold holes (not shown), such as the fuel gas supplying manifold hole, formed by the through holes extending in the thickness direction are formed on the peripheral portion of the anode separator 6*a*.

Meanwhile, a groove-like oxidizing gas channel 8 through which the oxidizing gas flows is formed in a serpentine shape on an inner surface of the cathode separator 6*b*, and the groove-like heat medium channel 9 through which the heat medium flows is formed in a serpentine shape on an outer surface of the cathode separator 6*b*. Moreover, as with the anode separator 6*a*, the manifold holes (not shown), such as the fuel gas supplying manifold hole, formed by the through holes extending in the thickness direction are formed on a peripheral portion of the cathode separator 6*b*.

Herein, each of the fuel gas channel 7, the oxidizing gas channel 8, and the heat medium channel 9 is formed in a serpentine shape. However, the present embodiment is not limited to this, and any shape is acceptable as long as the reactant gas or the heat medium flows through substantially the entire main surface of each of the separators 6*a* and 6*b*.

The cells 100 formed as above are stacked in the thickness direction to form a cell stack body. At this time, the manifold holes, such as the fuel gas supplying manifold hole, formed on the anode separator 6*a*, the cathode separator 6*b*, and the gasket 10 are connected to one another in the thickness direction by stacking the cells 100 to form manifolds, such as a fuel gas supplying manifold. Then, end plates on each of which a current collector and an insulating plate are disposed are disposed on both ends, respectively, of the cell stack body, and these components are fastened by fasteners. Thus, a cell stack (PEFC) is formed.

Next, the reason why the polymer electrolyte membrane 1 in the MEA 5 of the PEFC according to Embodiment 1 is bent will be explained while comparing with Comparative Example 1.

Comparative Example 1

Figure 12:
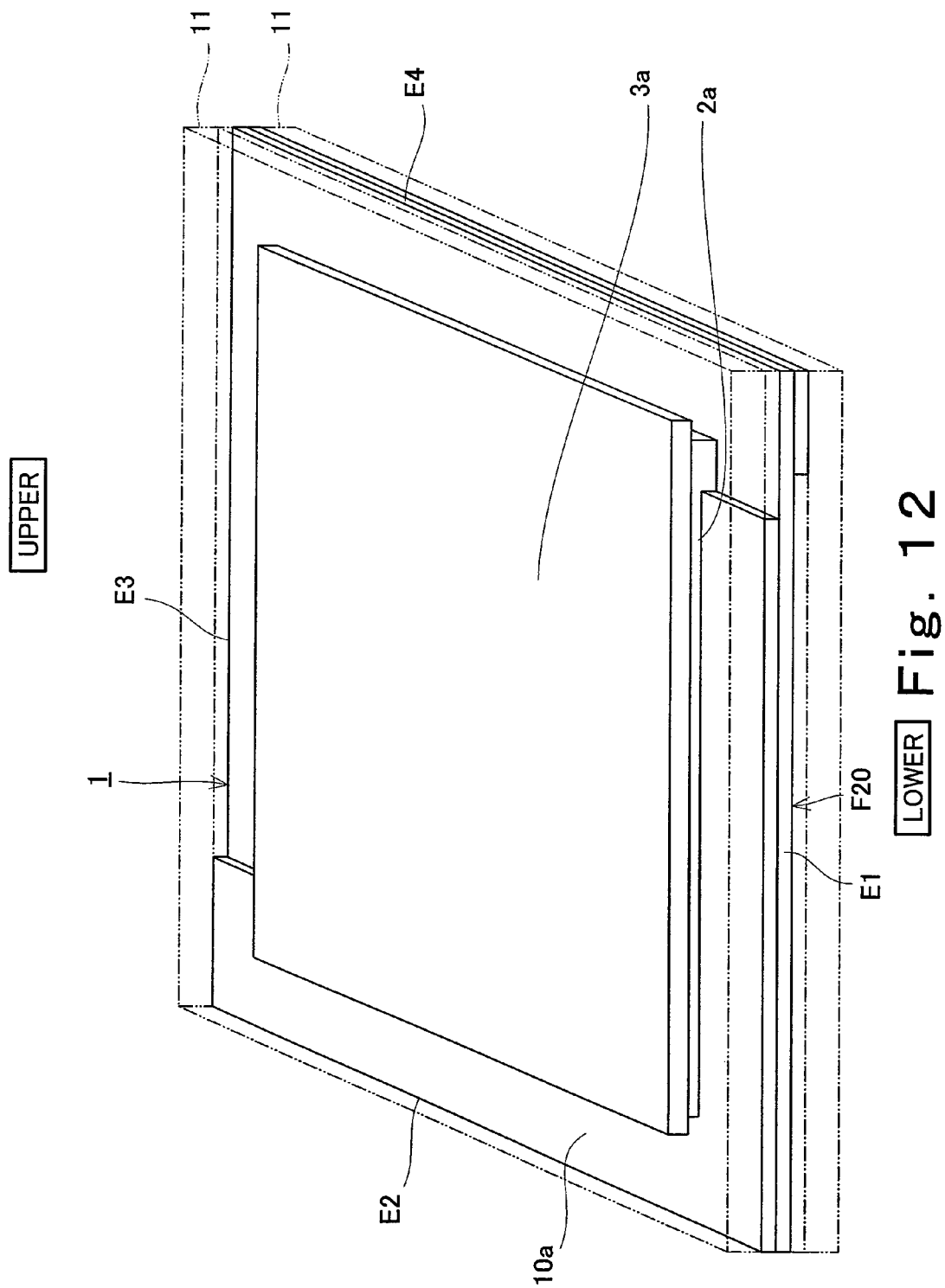
FIG. 12 is a schematic diagram showing a state where the polymer electrolyte membrane of the MEA is not bent (Comparative Example 1).

FIG. 12 is a schematic diagram showing a state where the polymer electrolyte membrane 1 of the MEA 5 is not bent (Comparative Example 1).

As shown in FIG. 12, since the polymer electrolyte membrane 1 of the MEA 5 of Comparative Example 1 is not bent, the main surface of the first membrane reinforcing member 10*a* is not flush with the first main surface F10 of the polymer electrolyte membrane 1, and the polymer electrolyte membrane 1 does not have a step portion. Therefore, in a case where the gasket 11 having a flat plate shape is disposed around the anode 4*a* of the MEA 5, gaps are formed at end portions (sides E3 and E4), where the first membrane reinforcing member 10*a* is not formed, of the first main surface F10 of the polymer electrolyte membrane 1. Similarly, gaps are formed at end portions (sides E1 and E2) of the second main surface F20 of the polymer electrolyte membrane 1. Therefore, in the case of constituting the PEFC using the MEA 5 of Comparative Example 1, it is difficult to seal these gap portions to prevent the leakage of the reactant gas. For example, although the leak of the reactant gas can be prevented by constituting the PEFC using the gasket 11 having a shape capable of filling the gap portions, the yield of the gasket 11 deteriorates, and the cost increases.

Therefore, in a case where the polymer electrolyte membrane 1 of the MEA 5 is bent as in the case of the PEFC according to Embodiment 1, the reactant gas can be prevented from leaking to the outside of the PEFC, and the PEFC can be manufactured at low cost.

Next, a method for manufacturing the cell in the PEFC according to Embodiment 1 will be explained. A method for manufacturing the cell and the cell stack (PEFC) using the MEA 5 manufactured as below is not especially limited, and known PEFC manufacturing technology can be adopted, so that a detailed explanation of the method is omitted.

First, the method for manufacturing a membrane-catalyst layer stack body 30 will be explained.

Figure 5:
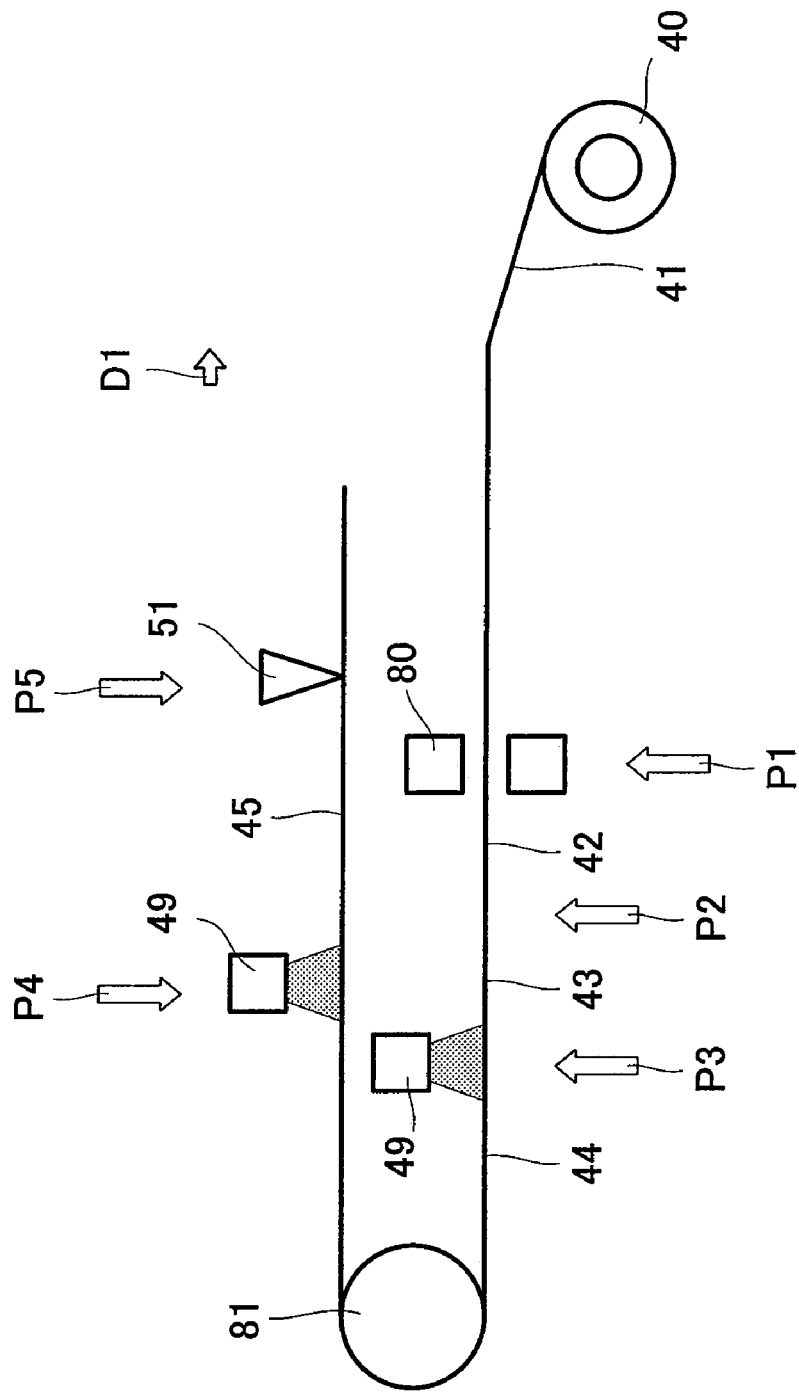
FIG. 5 is a schematic diagram schematically showing a part of a series of steps (treatment areas) of manufacturing a membrane-catalyst layer stack body shown in FIGS. 3(a) and 3(b), and a part of a manufacturing line for the membrane-catalyst layer stack body.

FIG. 5 is a schematic diagram schematically showing a part of a series of steps (treatment areas) of manufacturing the membrane-catalyst layer stack body 30 shown in FIGS. 3(*a*) and 3(*b*), and a part of a manufacturing line for the membrane-catalyst layer stack body 30.

As shown in FIG. 5, the membrane-catalyst layer stack body 30 is manufactured through a bonding step P1 of bonding a polymer electrolyte membrane sheet and the first and second membrane reinforcing members 10*a* and 10*b* to form a membrane-membrane reinforcing member stack body, a pressing step P2 of pressing the membrane-membrane reinforcing member stack body, first and second applying steps P3 and P4 of applying the catalyst layers on a membrane-membrane reinforcing member assembly sheet, and a cutting step P5 of cutting a membrane-catalyst layer assembly sheet. With this, the MEA 5 can be easily mass-produced at low cost.

First, the bonding step P1 will be explained.

A polymer electrolyte membrane roll 40 obtained by rolling a long polymer electrolyte membrane sheet 41 (that is a member from which the polymer electrolyte membrane 1 shown in FIG. 1 is obtained by cutting) is manufactured by using a known thin film manufacturing technique. Moreover, as shown in FIG. 10, a long membrane reinforcing member sheet 60 is sequentially cut to produce the first membrane reinforcing member 10a (or the second membrane reinforcing member 10b) having a substantially L shape.

Here, a method for manufacturing the first or second membrane reinforcing member 10a or 10b in the membrane-catalyst layer stack body 30 according to the present invention will be explained while comparing with the method for manufacturing the protective membrane in the fuel cell disclosed in Patent Document 1.

Figure 10:
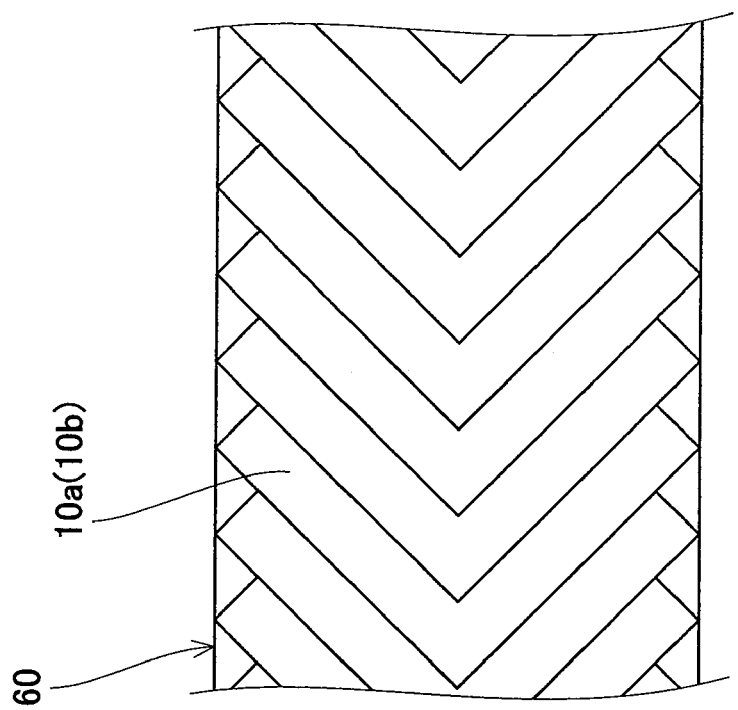
FIG. 10 is an explanatory diagram for explaining a method for manufacturing the membrane reinforcing member in the membrane-membrane reinforcing member assembly according to the present invention.
Figure 11:
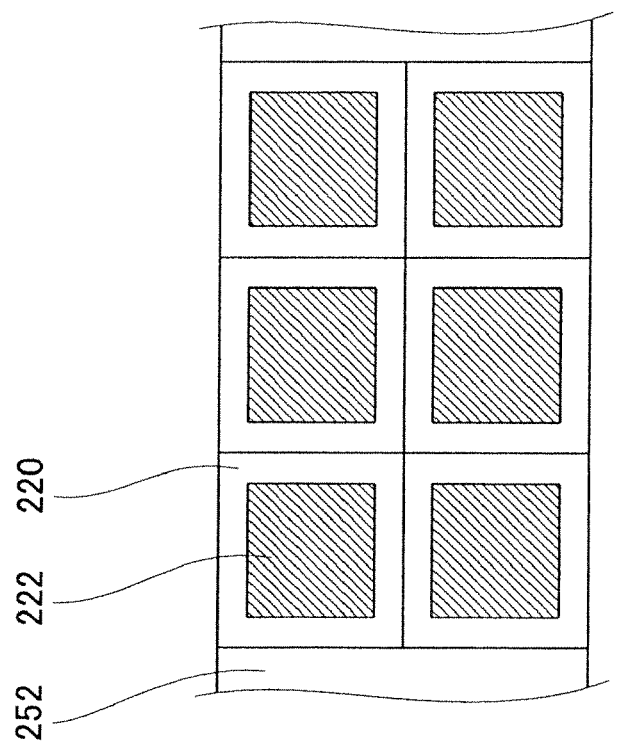
FIG. 11 is an explanatory diagram for explaining a method for manufacturing a protective membrane in the fuel cell disclosed in Patent Document 1.

FIG. 10 is an explanatory diagram for explaining a method for manufacturing the first or second membrane reinforcing member 10a or 10b in the membrane-catalyst layer stack body 30 according to the present invention. FIG. 11 is an explanatory diagram for explaining a method for manufacturing a protective membrane in the fuel cell disclosed in Patent Document 1.

As shown in FIG. 11, to manufacture a protective membrane 220 disclosed in Patent Document 1, a long protective membrane sheet 252 needs to be punched out to form a rectangular opening 222, and be then cut to obtain a frame-shaped piece. However, the punched pieces corresponding to the rectangular openings 222 become waste, so that the yield of the protective membrane 220 deteriorates. In contrast, as shown in FIG. 10, in the case of the membrane reinforcing member of the present invention, the long membrane reinforcing member sheet 60 is cut to form the first membrane reinforcing member 10a (or the second membrane reinforcing member 10b) having a substantially L shape. Therefore, the membrane reinforcing member sheet 60 can be utilized substantially entirely.

As above, in the case of the membrane-membrane reinforcing member assembly according to the present invention, the membrane reinforcing members can be efficiently manufactured from the membrane reinforcing member sheet. Therefore, the cost can be further reduced.

As shown in FIG. 5, the polymer electrolyte membrane sheet 41 is pulled out from the polymer electrolyte membrane roll 40 by driving a roller 81. Then, the first membrane reinforcing member 10a and the second membrane reinforcing member 10b are disposed on both main surfaces, respectively, of the polymer electrolyte membrane sheet 41, and the polymer electrolyte membrane sheet 41, the first membrane reinforcing member 10a, and the second membrane reinforcing member 10b are joined to one another by a heat press 80. At this time, the first membrane reinforcing member 10a and the second membrane reinforcing member 10b are positioned such that the short portions thereof extend along both end portions, respectively, of the polymer electrolyte membrane sheet 41, and the gaps 12a and 12b are formed as shown in FIG. 2(b).

A press surface of the heat press 80 is preheated to have a temperature equal to or higher than a glass transition temperature of the polymer electrolyte constituting the polymer electrolyte membrane sheet 41, and the heat treatment of the first membrane reinforcing member 10a and the second membrane reinforcing member 10b is carried out by the press surface. Then, the heat press 80 sandwiches the first membrane reinforcing member 10a, the polymer electrolyte membrane sheet 41, and the second membrane reinforcing member 10b and carries out a pressure treatment such that positioning errors of these members do not occur. Thus, a tape-shape membrane-membrane reinforcing member stack body 42 is formed (FIG. 5 does not show the first and second membrane reinforcing members 10a and 10b). Then, the membrane-membrane reinforcing member stack body 42 formed as above moves in a proceeding direction D1 by driving the roller 81. With this, the first and second membrane reinforcing members 10a and 10b are formed on the membrane-membrane reinforcing member stack body 42 at predetermined intervals in a longitudinal direction of the membrane-membrane reinforcing member stack body 42.

Before causing the first and second membrane reinforcing members 10a and 10b to contact the polymer electrolyte membrane sheet 41, a pretreatment of applying an adhesive to rear surfaces (contact surfaces) of the first and second membrane reinforcing members 10a and 10b may be carried out. In this case, the pressure treatment may be carried out after the heat press 80 is preheated, or only the pressure treatment may be carried out without preheating the heat press 80. Moreover, it is preferable that the adhesive do not deteriorate the battery characteristics. For example, it may be possible to use a dispersion medium or a solvent containing a polymer electrolyte material (shown above as the constituent material of the polymer electrolyte membrane 1) that is the same type as or different type (having an affinity so as to be able to be adequately integrated with the polymer electrolyte membrane sheet 41) from the polymer electrolyte membrane sheet 41.

Next, the pressing step P2 will be explained.

In the pressing step P2, a pressing means, not shown, carries out a pressure treatment with respect to the membrane-membrane reinforcing member stack body 42 formed in the bonding step P1. With this, the polymer electrolyte membrane sheet 41 of the membrane-membrane reinforcing member stack body 42 is bent. Thus, the surface of the first membrane reinforcing member 10a and a main surface of the polymer electrolyte membrane sheet 41 on which surface the first membrane reinforcing member 10a is disposed (to be precise, a portion of the main surface on which portion the first membrane reinforcing member 10a is not disposed) are flush with each other as a whole, and the surface of the second membrane reinforcing member 10b and a main surface of the polymer electrolyte membrane sheet 41 on which surface the second membrane reinforcing member 10b is disposed (to be precise, a portion of the main surface on which portion the second membrane reinforcing member 10b is not disposed) are flush with each other as a whole. With this, a membrane-membrane reinforcing member assembly sheet 43 is formed. This pressing treatment may be carried out when the membrane-membrane reinforcing member stack body 42 is formed in the bonding step P1.

Next, the first applying step P3 will be explained.

Figure 6:
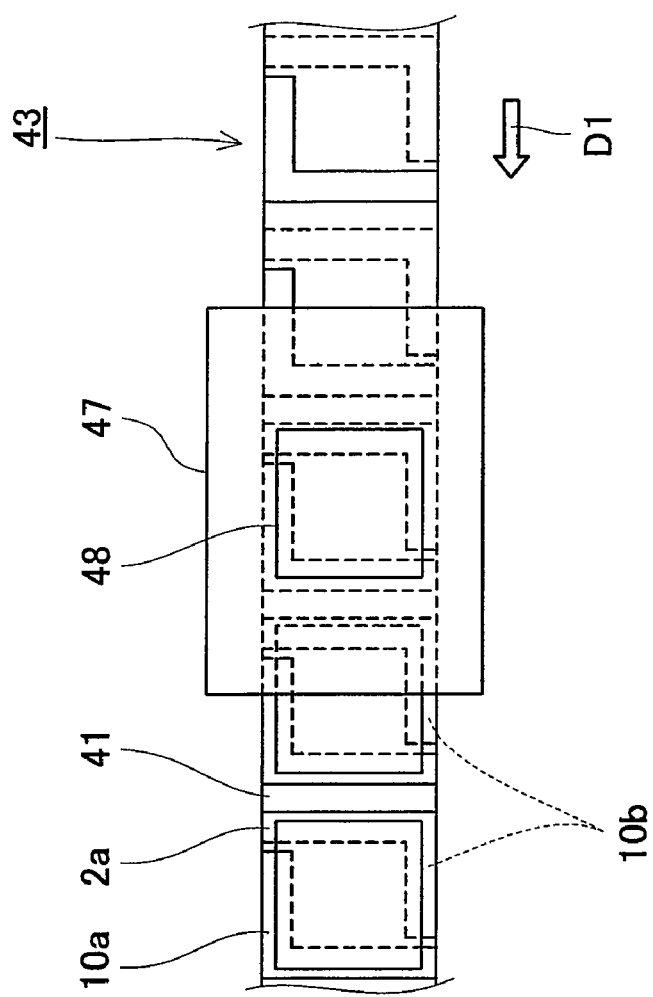
FIG. 6 is a schematic diagram for explaining a first applying step in a process of manufacturing the membrane-catalyst layer assembly shown in FIG. 5.

FIG. 6 is a schematic diagram for explaining the first applying step P3 in a process of manufacturing the membrane-catalyst layer assembly 30 shown in FIG. 5.

First, the configuration of an area where the first applying step P3 is carried out will be explained.

As shown in FIG. 6, in the area where the first applying step P3 is carried out, there are provided a mask 47 having an opening 48, a supporting means (supporting base for example), not shown, for supporting the membrane-membrane reinforcing member assembly sheet 43 from a rear surface of the membrane-membrane reinforcing member assembly sheet 43, and a catalyst layer forming device 49 (see FIG. 5). The shape of the opening 48 is designed to correspond to the shape of the main surface of the anode catalyst layer 2a shown in FIGS. 3(a) and 3(b). Moreover, the catalyst layer forming device 49 has a mechanism which, for example, applies or sprays the catalyst layer forming ink to form the anode catalyst layer 2a on the main surface of the membrane-membrane reinforcing member assembly sheet 43. As this mechanism, a mechanism adopted for forming the catalyst layer of the gas diffusion layer of the known fuel cell may be adopted. For example, it is possible to adopt a mechanism designed based on a spraying method, a spin coating method, a doctor blade method, a die coating method, or a screen printing.

Next, the treatment of the first applying step P3 will be explained.

First, the membrane-membrane reinforcing member assembly sheet 43 formed in the pressing step P2 proceeds to the area of the first applying step P3 and stops once. Then, the membrane-membrane reinforcing member assembly sheet 43 is fixedly sandwiched between the mask 47 and the supporting base, not shown. Next, the catalyst layer forming device 49 starts operating. By, for example, applying the catalyst layer forming ink from above the opening 48 of the mask 47, the anode catalyst layer 2a is formed to cover the surface of the polymer electrolyte membrane sheet 41 of the membrane-membrane reinforcing member assembly sheet 43 and at least a part of the main surface of the first membrane reinforcing member 10a. After the anode catalyst layer 2a is formed, the mask 47 and the supporting base are separated from the membrane-membrane reinforcing member assembly sheet 43. A membrane-catalyst layer sheet 44 formed in this manner moves in the proceeding direction D1 by driving the roller 81. Thus, the anode catalyst layers 2a are formed on the membrane-catalyst layer sheet 44 at predetermined intervals in a longitudinal direction of the membrane-catalyst layer sheet 44 (formed on a portion where the first membrane reinforcing member 10a is disposed). Then, the membrane-catalyst layer sheet 44 further moves in the proceeding direction D1 by driving the roller 82, and is turned over by the roller 82 such that the rear surface (main surface on which the anode catalyst layer 2a is not formed) of the membrane-catalyst layer sheet 44 faces upward.

Next, the second applying step P4 will be explained.

The configuration of the area of the second applying step P4 is the same as that of the area of the first applying step P3, so that a detailed explanation thereof is omitted.

As shown in FIG. 5, the membrane-catalyst layer sheet 44 formed in the first applying step P3 proceeds to the area of the second applying step P4 and stops once. Then, the membrane-catalyst layer sheet 44 is fixedly sandwiched between the mask 47 and the supporting base, not shown. Next, the catalyst layer forming device 49 starts operating. By, for example, applying the catalyst layer forming ink from above the opening 48 of the mask 47, the cathode catalyst layer 2b is formed to cover the rear surface of the polymer electrolyte membrane sheet 41 of the membrane-catalyst layer sheet 44 and at least a part of the main surface of the second membrane reinforcing member 10b. At this time, the cathode catalyst layer 2b is formed to overlap the anode catalyst layer 2a when viewed from the thickness direction of the membrane-catalyst layer sheet 44. After the cathode catalyst layer 2b is formed, the mask 47 and the supporting base are separated from the membrane-catalyst layer sheet 44. A membrane-catalyst layer assembly sheet 45 formed in this manner moves in the proceeding direction D1 by driving the roller 81. Thus, the cathode catalyst layers 2b are formed on the membrane-catalyst layer assembly sheet 45 at predetermined intervals in a longitudinal direction of the membrane-catalyst layer assembly sheet 45 (so as to overlap the anode catalyst layers 2a). Then, the membrane-catalyst layer assembly sheet 45 further moves in the proceeding direction D1 by driving the roller 81.

The ingredient composition, degree of dryness, and the like of the catalyst layer 2 are adjusted such that the catalyst layer 2 has an appropriate bendability. In addition, the catalyst layer 2 is subjected to such a treatment (for example, the supporting base is heated, and a dispersing agent of the catalyst layer forming ink is subjected to a drying treatment.) that even in a case where the membrane-catalyst layer sheet 44 is disposed upside down, the catalyst layer 2 does not fall off from the polymer electrolyte membrane sheet 41 and the first membrane reinforcing member 10a. Moreover, the drying treatment (for example, at least one of the heat treatment, an air blow treatment, and a deaeration treatment) may be suitably carried out each time the catalyst layer 2 is formed. Further, the treatment of the first applying step P3 and the treatment of the second applying step P4 may be carried out in the same area.

Next, the cutting step P5 will be explained.

The membrane-catalyst layer assembly sheet 45 formed in the second applying step P4 is introduced into a cutting device 51, and is cut by a cutting mechanism of the cutting device into pieces each having a predetermined size. Thus, the membrane-catalyst layer assembly 30 shown in FIGS. 3(a) and 3(b) is obtained.

In the manufacturing line for the membrane-catalyst layer assembly shown in FIG. 5, a single sheet moves until the polymer electrolyte membrane sheet 41 that is a material becomes the membrane-catalyst layer assembly sheet 45. To appropriately move the sheet in the proceeding direction D1, a towing mechanism, such as a capstan or a pair of rollers, for towing the sheet, a tension applying mechanism, such as a tensioner, for applying an appropriate tension to the sheet, and a sheet temporary holding and feeding mechanism, such as a dancer roller, for temporarily stopping the sheet at a predetermined area (the area of the second applying step P4 for example) and then rapidly feeding the sheet are provided at appropriate positions in the manufacturing line. However, since these are known in the art, explanations thereof are omitted.

Next, a method for manufacturing the MEA 5 will be explained.

The gas diffusion layer 3 (carbon cloth for example) precut to have a suitable size is joined to the main surface of the catalyst layer 2 of the membrane-catalyst layer assembly 30 obtained as above. Thus, the MEA 5 is obtained. The MEA 5 may be formed after the water-repellent carbon layer is formed by, for example, applying an water-repellent carbon layer forming ink to the main surface of the catalyst layer 2 or the main surface of the gas diffusion layer 3 in advance.

Moreover, the MEA 5 may be formed by causing the gas diffusion layer 3 to be joined to the main surface of the catalyst layer 2 of the membrane-catalyst layer assembly sheet 45 before the cutting step P5. In this case, a membrane-electrode sheet may be formed by causing the precut gas diffusion layer 3 to be joined to the main surface of the catalyst layer 2. Moreover, the membrane-electrode sheet may be formed by causing the tape-shape gas diffusion layer to be joined to the main surface of the catalyst layer 2 and cutting it. Then, a pair of obtained membrane-electrode sheets are joined to each other and are cut in the same manner as in the cutting step P5. Thus, the MEA 5 is formed.

As above, the PEFC according to Embodiment 1 can secure adequate durability of each cell and can easily realize the cost reduction of the fuel cell and further productivity improvement of the fuel cell.

Embodiment 2

Figure 7:
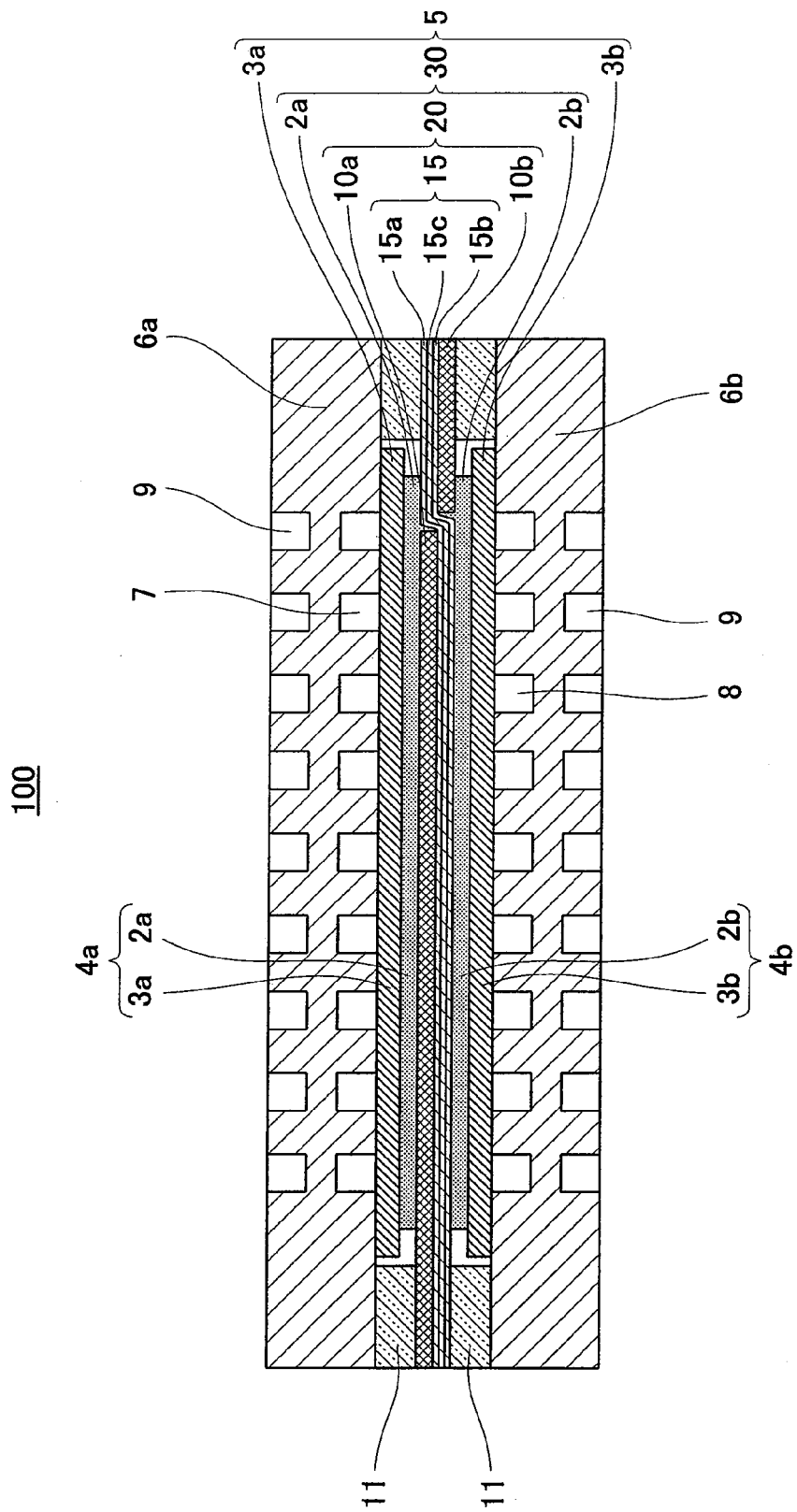
FIG. 7 is a schematic diagram showing a schematic configuration of the cell of the PEFC according to Embodiment 2 of the present invention.
Figure 9:
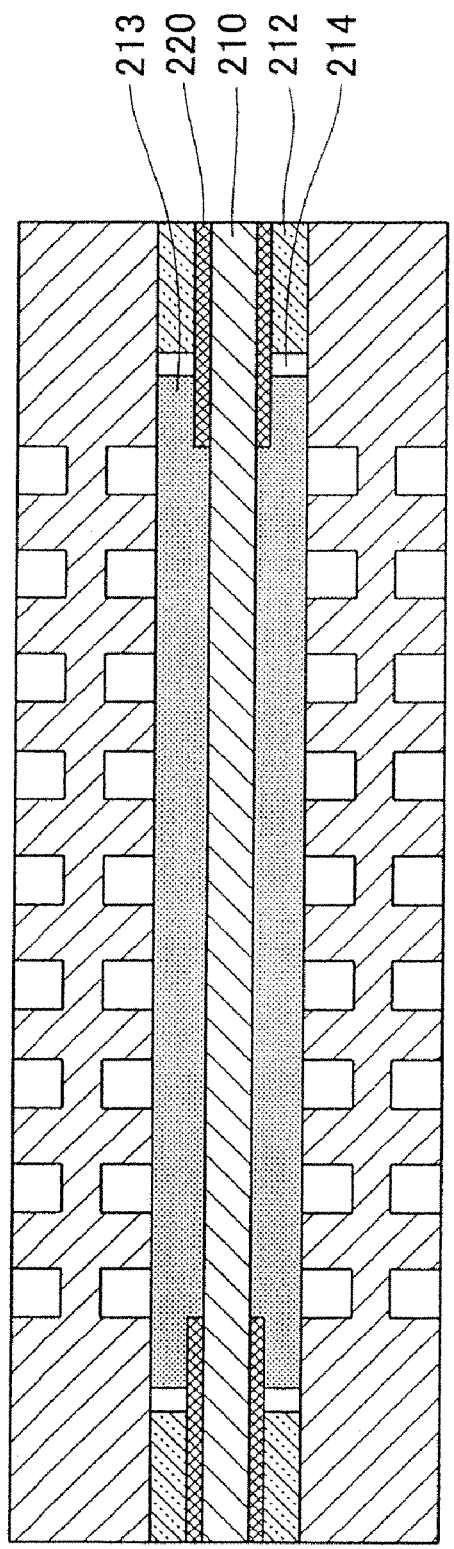
FIG. 9 is a schematic diagram showing an outline of a seal structure of a solid polymer electrolyte fuel cell disclosed in Patent Document 1.

FIG. 7 is a schematic diagram showing a schematic configuration of the cell of the PEFC according to Embodiment 2 of the present invention.

The PEFC according to Embodiment 2 of the present invention is the same in basic configuration as the PEFC according to Embodiment 1 but is different from the PEFC according to Embodiment 1 as below.

As shown in FIG. 7, the cell of the PEFC according to Embodiment 2 is provided with a polymer electrolyte membrane-inner reinforcing membrane complex 15 instead of the polymer electrolyte membrane 1. Note that "polymer electrolyte membrane" in CLAIMS of the present application includes the polymer electrolyte membrane-inner reinforcing membrane complex 15. The polymer electrolyte membrane-inner reinforcing membrane complex 15 includes a pair of small piece-like polymer electrolyte membranes 15a and 15b and a small piece-like inner reinforcing membrane 15c. The polymer electrolyte membranes 15a and 15b are disposed such that main surfaces thereof are opposed to each other. The inner reinforcing membrane 15c is sandwiched between the polymer electrolyte membranes 15a and 15b.

Next, the inner reinforcing membrane 15c will be explained in more detail in reference to FIG. 8.

FIG. 8 is a schematic diagram of a schematic configuration of the inner reinforcing membrane 15c of the polymer electrolyte membrane-inner reinforcing membrane complex 15 in the cell 100 shown in FIG. 7. In FIG. 8, a part of the inner reinforcing membrane 15c is omitted.

As shown in FIG. 8, the inner reinforcing membrane 15c has a plurality of openings (through holes) 16 penetrating the inner reinforcing membrane 15c in the thickness direction. The openings 16 are filled with polymer electrolyte which is the same as or different from the polymer electrolyte of the polymer electrolyte membranes 15a and 15b. It is preferable that an area ratio (opening degree) of the openings 16 to the main surface of the inner reinforcing membrane 15c be 50% to 90%. It is preferable that the opening degree be set to 50% or more, since adequate ion electrical conductivity can be easily obtained. Meanwhile, it is preferable that the opening degree be set to 90% or lower, since adequate mechanical strength of the inner reinforcing membrane 15c can be easily obtained. The opening 16 of the inner reinforcing membrane 15c may be a very fine hole (having a pore diameter of several tens of micrometers for example). Even in this case, it is preferable that the opening degree (porosity) be 50% to 90% due to the same reason as above.

The inner reinforcing membrane 15c may be a resin film or an extended porous film (not shown: for example, Product Name "Gore-Select(II)" manufactured by Japan Gore-Tex Inc.).

In light of the chemical stability and the mechanical stability, the resin constituting the inner reinforcing membrane 15c is preferably at least one synthetic resin selected from the group consisting of polytetrafluoroethylene, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Moreover, the inner reinforcing membrane 15c may be configured such that at least one of fibrous reinforcing body particles and spherical reinforcing body particles are contained in a plate-like polymer electrolyte membrane to increase the strength of the polymer electrolyte membrane. One example of the constituent material of the reinforcing body particles is the resin constituting the inner reinforcing membrane 15c.

The method for manufacturing the polymer electrolyte membrane-inner reinforcing membrane complex 15 is not especially limited, and the polymer electrolyte membrane-inner reinforcing membrane complex 15 can be manufactured by using a known thin film manufacturing technique. The cell of the PEFC can be manufactured by the same method as the above cell except that the polymer electrolyte membrane-inner reinforcing membrane complex 15 is used.

As above, the PEFC according to Embodiment 2 can increase the mechanical strength of the entire polymer electrolyte membrane. In addition, even if the polymer electrolyte membrane is damaged, the cross leakage of the reactant gas can be surely prevented by the inner reinforcing membrane.

Embodiment 3

The PEFC according to Embodiment 3 of the present invention is the same in basic configuration as the PEFC according to Embodiment 1. However, the configurations of the membrane-membrane reinforcing member assembly and the membrane-catalyst layer assembly are different as below.

First, the membrane-membrane reinforcing member assembly according to Embodiment 3 of the present invention will be explained.

Figure 13:
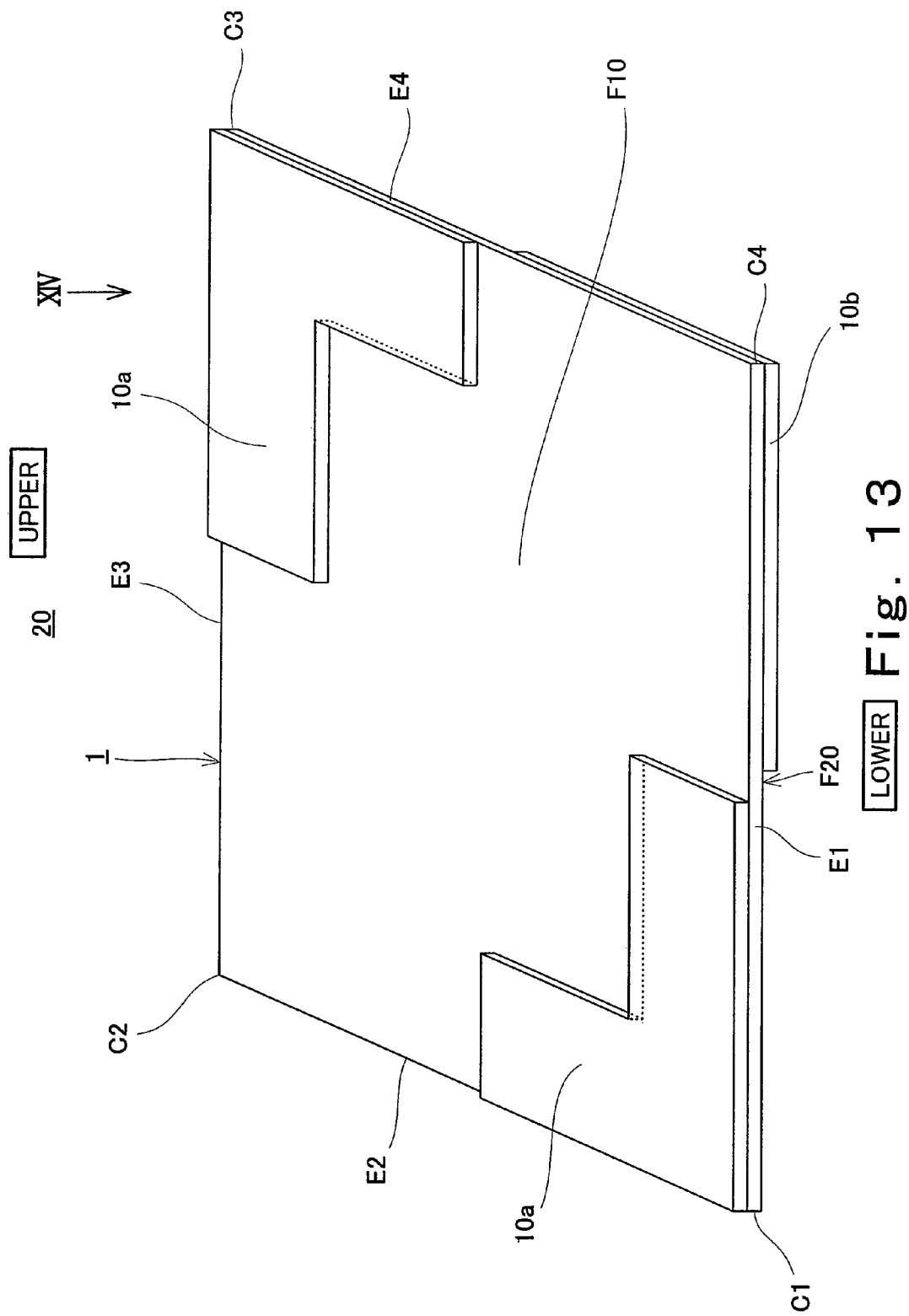
FIG. 13 is a perspective view schematically showing a state where a pair of first membrane reinforcing members and a pair of second membrane reinforcing members are disposed on the polymer electrolyte membrane.
Figure 14:
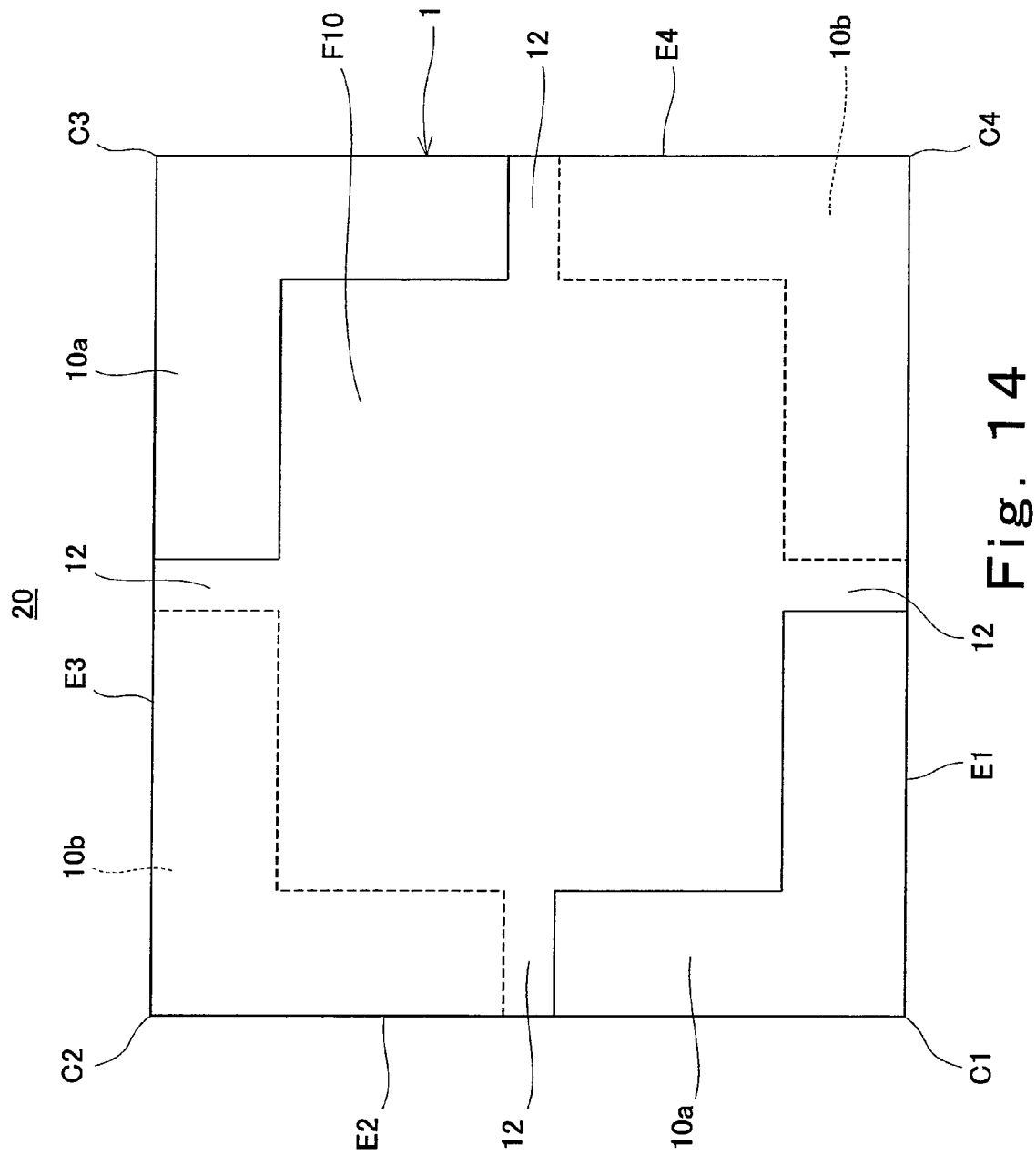
FIG. 14 is a schematic diagram showing the membrane-membrane reinforcing member assembly when viewed from a direction indicated by an arrow XIV in FIG. 13.
Figure 15:
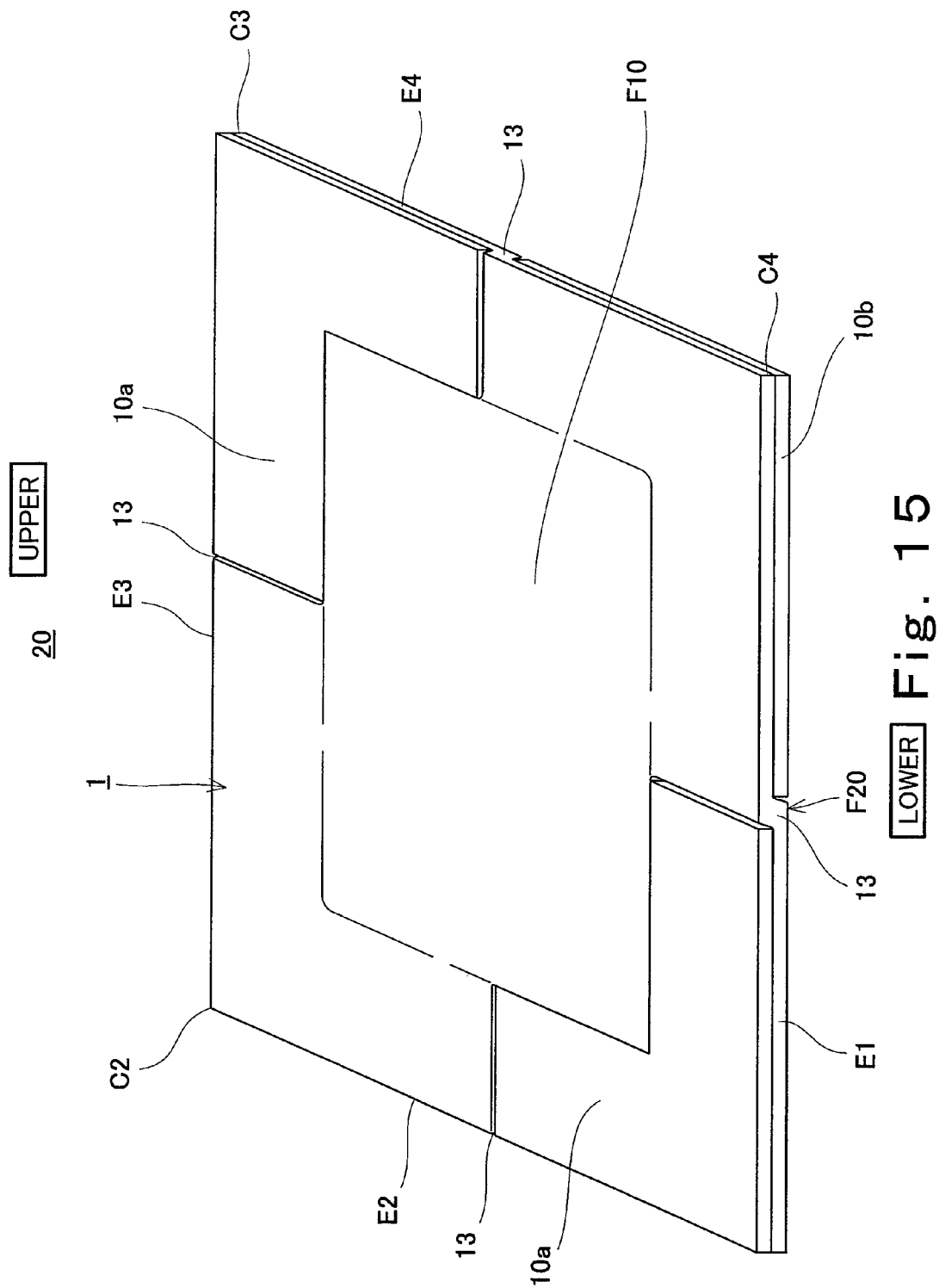
FIG. 15 is a perspective view schematically showing a schematic configuration of the membrane-membrane reinforcing member assembly according to Embodiment 3.

FIG. 13 is a perspective view schematically showing a state where a pair of first membrane reinforcing members and a pair of second membrane reinforcing members are disposed on the polymer electrolyte membrane. FIG. 14 is a schematic diagram showing the membrane-membrane reinforcing member assembly when viewed from a direction indicated by an arrow XIV in FIG. 13. FIG. 15 is a perspective view schematically showing a schematic configuration of the membrane-membrane reinforcing member assembly according to Embodiment 3. In FIGS. 13 to 15, a vertical direction of the membrane-membrane reinforcing member assembly is shown as a vertical direction of the drawing, and manifold holes, such as a below-described fuel gas supplying manifold hole, are not shown.

As shown in FIG. 13, the polymer electrolyte membrane 1 is formed in a substantially quadrilateral shape (herein, rectangular shape) having the sides E1 to E4, and has the first main surface F10 and the second main surface F20 which are opposed to each other. A pair of first membrane reinforcing members 10a each having a membrane-like shape and a substantially L shape are disposed on the first main surface F10 such that bent portions thereof are located at opposed corner portions (corners) C1 and C3, respectively, of the polymer electrolyte membrane 1. A pair of second membrane reinforcing members 10b each having a membrane-like shape and a substantially L shape are disposed on the second main surface F20 such that bent portions thereof are located at opposed corner portions (corners) C2 and C4, respectively, of the polymer electrolyte membrane 1.

Specifically, the first membrane reinforcing member 10a has the bent portion, a first extending portion and a second extending portion both having a band shape extend from the bent portion in two directions substantially perpendicular to each other, and the first membrane reinforcing member 10a is formed in a substantially L shape as a whole. One of the first membrane reinforcing members 10a is disposed on the first main surface F10 such that the first extending portion and the second extending portion extend along the side E1 and the side E2, respectively, of the polymer electrolyte membrane 1. The other first membrane reinforcing member 10a is disposed on the first main surface F10 such that the first extending portion and the second extending portion extend along the side E3 and the side E4, respectively, of the polymer electrolyte membrane 1. Herein, the width and length of the first extending portion are respectively the same as the width and length of the second extending portion.

Moreover, the second membrane reinforcing member 10b is formed to have the same shape as the first membrane reinforcing member 10a. One of the second membrane reinforcing members 10b is disposed on the second main surface F20 such that the first extending portion and the second extending portion extend along the side E2 and the side E3, respectively, of the polymer electrolyte membrane 1. The other second membrane reinforcing member 10b is disposed on the second main surface F20 such that the first extending portion and the second extending portion extend along the side E4 and the side E1, respectively, of the polymer electrolyte membrane 1.

As shown in FIG. 14, the pair of first membrane reinforcing members 10a are disposed on the first main surface F10 and the pair of second membrane reinforcing members 10b are disposed on the second main surface F20 such that each of the gaps 12 is formed between opposed end surfaces of the first membrane reinforcing member 10a and the second membrane reinforcing members 10b when viewed from the thickness direction of the polymer electrolyte membrane 1. The width of each gap 12 is slightly larger than the thickness of each of the first membrane reinforcing member 10a and the second membrane reinforcing member 10b. As above, the first membrane reinforcing members 10a and the second membrane reinforcing members 10b are disposed to extend along four sides of the polymer electrolyte membrane 1 and surround the peripheral portion of the polymer electrolyte membrane 1 as a whole.

Then, the first and second membrane reinforcing members 10a and 10b are disposed on the polymer electrolyte membrane 1 as described above, and these members 1, 10a, and 10b are pressed by a pressing means as described below to bend the polymer electrolyte membrane 1. Thus, the membrane-membrane reinforcing member assembly 20 is formed.

As shown in FIG. 15, the polymer electrolyte membrane 1 of the bent the membrane-membrane reinforcing member assembly 20 is bent such that: a main surface (hereinafter referred to as "front surface") of the first membrane reinforcing member 10a which surface does not contact the polymer electrolyte membrane 1 and a portion of the first main surface F10 on which portion the first membrane reinforcing member 10a is not disposed are flush with each other as a whole; and a main surface (hereinafter referred to as "front surface") of the second membrane reinforcing member 10b which surface does not contact the polymer electrolyte membrane 1 and a portion of the second main surface F20 on which portion the second membrane reinforcing member 10b is not disposed are flush with each other as a whole. Since the polymer electrolyte membrane 1 is bent as above, the bent portion 13 is formed at each of the gaps 12.

Next, the membrane-catalyst layer assembly according to Embodiment 3 will be explained in reference to FIGS. 16 and 17.

Figure 16:
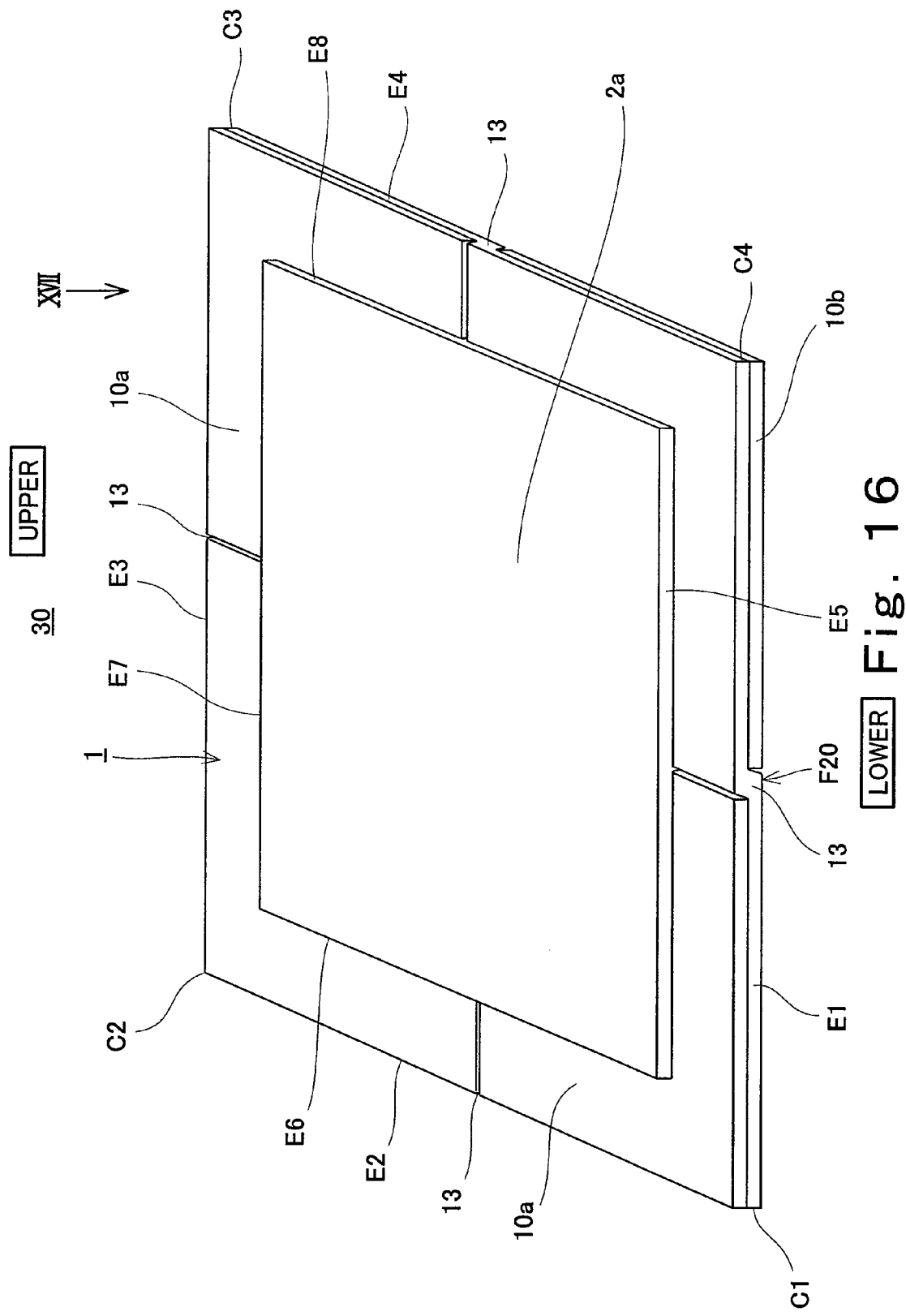
FIG. 16 is a perspective view schematically showing a schematic configuration of the membrane-catalyst layer assembly formed by disposing a catalyst layer on the membrane-membrane reinforcing member assembly shown in FIG. 15.

FIG. 16 is a perspective view schematically showing a schematic configuration of the membrane-catalyst layer assembly formed by disposing the catalyst layer on the membrane-membrane reinforcing member assembly 20 shown in FIG. 15. FIG. 17 is a schematic diagram when viewed from a direction indicated by an arrow XVII shown in FIG. 16. In FIG. 16, a vertical direction of the membrane-catalyst layer assembly is shown as a vertical direction of the drawing. In FIGS. 16 and 17, the manifold holes, such as the fuel gas supplying manifold hole, are not shown.

Figure 17:
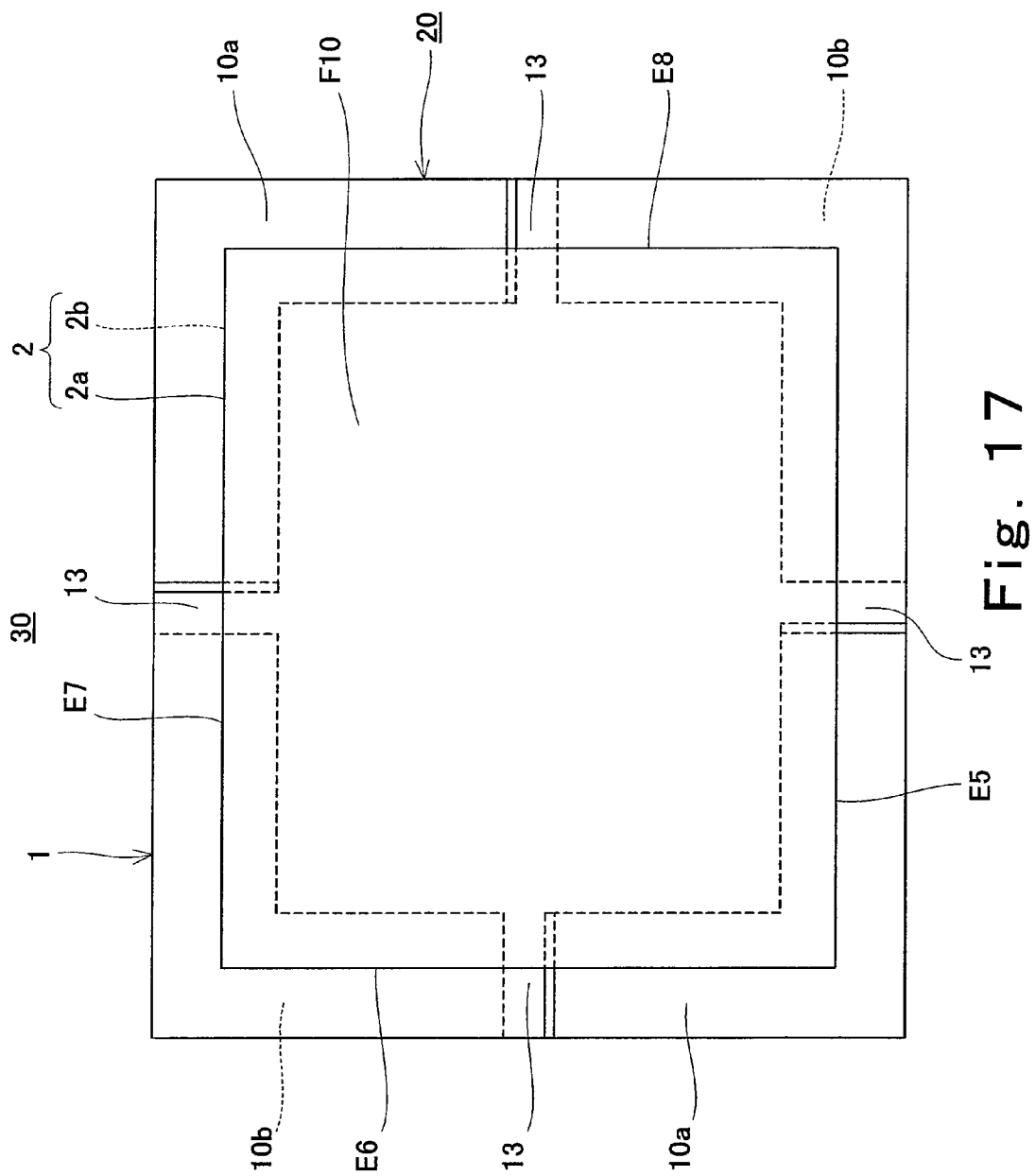
FIG. 17 is a schematic diagram when viewed from a direction indicated by an arrow XVII shown in FIG. 16.

As shown in FIGS. 16 and 17, the membrane-catalyst layer assembly 30 includes the membrane-membrane reinforcing member assembly 20 and the catalyst layers 2 (the anode catalyst layer 2a and the cathode catalyst layer 2b). The anode catalyst layer 2a is disposed to cover a portion of the first main surface F10 of the polymer electrolyte membrane 1 on which portion the first membrane reinforcing member 10a is not disposed, and the front surface of the first membrane reinforcing member 10a. Moreover, the cathode catalyst layer 2b is disposed to cover a portion of the second main surface F20 of the polymer electrolyte membrane 1 on which portion the second membrane reinforcing member 10b is not disposed, and the front surface of the second membrane reinforcing member 10b.

As shown in FIG. 17, herein, the anode catalyst layer 2a and the cathode catalyst layer 2b are formed in a rectangular shape similar to the shape of the polymer electrolyte membrane 1, and are disposed such that the peripheral portions thereof overlap the first membrane reinforcing member 10a and the second membrane reinforcing member 10b, respectively, as a whole when viewed from the thickness direction (direction indicated by the arrow V) of the polymer electrolyte membrane 1.

With this, since a part of each of end portions (sides E5 to E8) of the anode catalyst layer 2a contacts the first membrane reinforcing member 10a but does not directly contact the first main surface F10 of the polymer electrolyte membrane 1, the polymer electrolyte membrane 1 is not damaged at this part. Similarly, since a part of each of end portions (sides E5 to E8) of the cathode catalyst layer 2b contacts the second membrane reinforcing member 10b but does not directly contact the second main surface F20 of the polymer electrolyte membrane 1, the polymer electrolyte membrane 1 is not damaged.

In contrast, since a part of each of the end portions (sides E5 to E8) of the anode catalyst layer 2a directly contacts the first main surface F10 of the polymer electrolyte membrane 1, the polymer electrolyte membrane 1 may be damaged at this contact part. However, even in this case, since the second membrane reinforcing member 10b is disposed at a portion of the second main surface F20 of the polymer electrolyte membrane 1 which portion corresponds to the contact part, the cross leakage of the reactant gas does not occur. Similarly, since a part of each of the end portions (sides E5 to E8) of the cathode catalyst layer 2b directly contacts the second main surface F20 of the polymer electrolyte membrane 1, the polymer electrolyte membrane 1 may be damaged at this contact part. Even in this case, since the first membrane reinforcing member 10a is disposed at a portion of the first main surface F10 of the polymer electrolyte membrane 1 which portion corresponds to the contact part, the cross leakage of the reactant gas does not occur. Further, the first membrane reinforcing member 10a and the second membrane reinforcing member 10b are not disposed at the bent portion 13 where the polymer electrolyte membrane 1 is bent. However, as shown in FIG. 16, the bent portion 13 is formed to be thicker than the other portions of the polymer electrolyte membrane 1. Therefore, even if the end portion of the catalyst layer 2 directly contacts the bent portion 13, the polymer electrolyte membrane 1 is not damaged.

The method for manufacturing the cell of the PEFC according to Embodiment 3 is basically the same as the method for manufacturing the cell of the PEFC according to Embodiment 1, so that a detailed explanation thereof is omitted. Herein, the polymer electrolyte membrane 1 is used. However, as in the PEFC according to Embodiment 2, the polymer electrolyte membrane-inner reinforcing membrane complex 15 may be used instead of the polymer electrolyte membrane 1.

The PEFC according to Embodiment 3 configured as above has the same operational advantages as the PEFC according to Embodiment 1.

Next, a modification example of the membrane-membrane reinforcing member assembly 20 according to Embodiment 3 will be explained.

Modification Example 1

Figure 18:
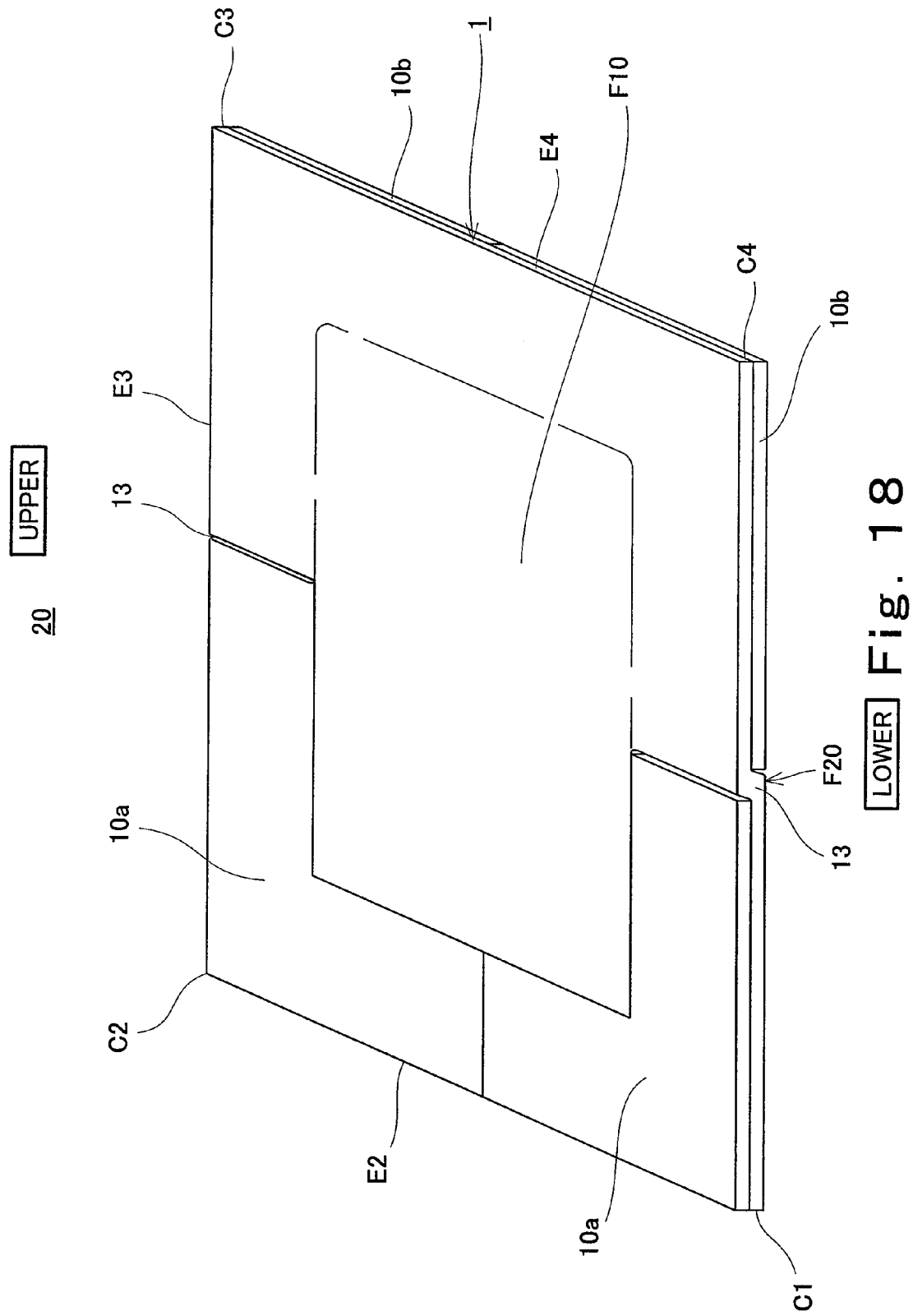
FIG. 18 is a perspective view schematically showing a schematic configuration of a modification example of the membrane-membrane reinforcing member assembly according to Embodiment 3 when viewed obliquely from above.

FIG. 18 is a perspective view schematically showing a schematic configuration of a modification example of the membrane-membrane reinforcing member assembly 20 according to Embodiment 3 when viewed obliquely from above. In FIG. 18, a vertical direction of the membrane-membrane reinforcing member assembly 20 is shown as a vertical direction of the drawing.

As shown in FIG. 18, in the membrane-membrane reinforcing member assembly 20 according to Modification Example 1, a pair of first membrane reinforcing members 10a are disposed such that one end surfaces thereof contact each other, and bent portions thereof coincide with adjacent corners C1 and C2, respectively, of the polymer electrolyte membrane 1. Similarly, a pair of second membrane reinforcing members 10b are disposed such that one end surfaces thereof contact each other, and bent portions thereof coincide with adjacent corners C3 and C4, respectively. Therefore, the positioning of the first and second membrane reinforcing members 10a and 10b becomes easy when manufacturing the membrane-membrane reinforcing member assembly 20. Herein, the pair of first membrane reinforcing members 10a are disposed such that one end surfaces thereof contact each other (the pair of second membrane reinforcing members 10b are disposed such that one end surfaces thereof contact each other). However, the present modification example is not limited to this, and the end surface of the first membrane reinforcing member 10a and the end surface of the second membrane reinforcing member 10b may contact each other.

The PEFC using the membrane-membrane reinforcing member assembly 20 of Modification Example 1 configured as above has the same operational advantages as the PEFC according to Embodiment 1.

The foregoing has explained the embodiments of the present invention in detail. However, the present invention is not limited to these embodiments.

For example, the above embodiments of the present invention have explained a case where outer peripheral portions (edges) of the first membrane reinforcing member and the second membrane reinforcing member correspond to a peripheral portion (edge) of the polymer electrolyte membrane (case where when viewed from a substantially normal direction of the main surface of the polymer electrolyte membrane, the outer edges of the first membrane reinforcing member and the second membrane reinforcing member overlap the edge of the polymer electrolyte membrane, and the edge of the polymer electrolyte membrane cannot be seen because it is not protruding). However, the present invention is not limited to this. As long as the effects of the present invention can be obtained, the edge of the first membrane reinforcing member and/or the edge of the second membrane reinforcing member may entirely or partially protrude from the edge of the polymer electrolyte membrane, or the edge of the polymer electrolyte membrane may entirely or partially protrude from the edge of the first membrane reinforcing member and/or the edge of the second membrane reinforcing member.

Moreover, the polymer electrolyte membrane 1 may have a substantially quadrilateral shape. For example, each of four interior angles of the polymer electrolyte membrane 1 does not have to be 90 degrees. Four sides of the polymer electrolyte membrane 1 may be bent to some extent. Four corners of the polymer electrolyte membrane 1 may be chamfered.

INDUSTRIAL APPLICABILITY

The membrane-membrane reinforcing member assembly, the membrane-catalyst layer assembly, and the membrane-electrode assembly according to the present invention are useful as parts of the polymer electrolyte fuel cell which can be mass-produced.

The polymer electrolyte fuel cell of the present invention is expected to be preferably used as a main power supply or an auxiliary power supply of, for example, movable bodies, such as a car, and distributed (on-site) power generating systems (domestic cogeneration systems).

The invention claimed is:

1. A membrane-membrane reinforcing member assembly comprising:
   a polymer electrolyte membrane having a substantially quadrilateral shape;
   a first membrane reinforcing member disposed on a first main surface of the polymer electrolyte membrane to bend at a substantially right angle at a corner of the polymer electrolyte membrane and extend along sides forming the corner; and
   a second membrane reinforcing member disposed on a second main surface of the polymer electrolyte membrane to bend at a substantially right angle at a corner of the polymer electrolyte membrane and extend along sides forming the corner, wherein
   the first membrane reinforcing member and the second membrane reinforcing member are disposed to extend along four sides of the polymer electrolyte membrane as a whole and not to overlap each other when viewed from a thickness direction of the polymer electrolyte membrane.

2. The membrane-membrane reinforcing member assembly according to claim 1, wherein:
   a pair of the first membrane reinforcing members are disposed at one pair of corners, respectively, of the polymer electrolyte membrane on the first main surface of the polymer electrolyte membrane;
   a pair of the second membrane reinforcing members are disposed at the other pair of corners, respectively, of the polymer electrolyte membrane on the second main surface of the polymer electrolyte membrane; and
   the pair of the first membrane reinforcing members and the pair of the second membrane reinforcing members are disposed so as not to overlap one another when viewed from a thickness direction of the polymer electrolyte membrane.

3. The membrane-membrane reinforcing member assembly according to claim 2, wherein the pair of the first membrane reinforcing members are disposed to bend at one pair of adjacent corners, respectively, of the polymer electrolyte membrane, and the pair of the second membrane reinforcing members are disposed to bend at the other pair of adjacent corners, respectively, of the polymer electrolyte membrane.

4. The membrane-membrane reinforcing member assembly according to claim 2, wherein the pair of the first membrane reinforcing members are disposed to bend at one pair of opposed corners, respectively, of the polymer electrolyte membrane, and the pair of the second membrane reinforcing members are disposed to bend at the other pair of opposed corners, respectively, of the polymer electrolyte membrane.

5. The membrane-membrane reinforcing member assembly according to claim 1, wherein the polymer electrolyte membrane is bent such that: a main surface of the first membrane reinforcing member which surface does not contact the polymer electrolyte membrane and a portion of the first main surface on which portion the first membrane reinforcing member is not disposed are flush with each other as a whole; and a main surface of the second membrane reinforcing member which surface does not contact the polymer electrolyte membrane and a portion of the second main surface on which portion the second membrane reinforcing member is not disposed are flush with each other as a whole.

6. The membrane-membrane reinforcing member assembly according to claim 1, wherein the polymer electrolyte membrane includes an inner reinforcing membrane having therein a through hole that serves as an ion conduction path.

7. A membrane-catalyst layer assembly comprising:
   the membrane-membrane reinforcing member assembly according to claim 1;
   a first catalyst layer disposed to cover the first main surface of the polymer electrolyte membrane; and
   a second catalyst layer disposed to cover the second main surface of the polymer electrolyte membrane, wherein
   the first catalyst layer and the second catalyst layer are disposed such that peripheral portions thereof overlap the first membrane reinforcing member and the second membrane reinforcing member, respectively, over an entire periphery when viewed in a thickness direction of the polymer electrolyte membrane.

8. A membrane-electrode assembly comprising:
   the membrane-catalyst layer assembly according to claim 7;
   a first gas diffusion layer disposed to cover the first catalyst layer of the membrane-catalyst layer assembly; and
   a second gas diffusion layer disposed to cover the second catalyst layer of the membrane-catalyst layer assembly.

9. A polymer electrolyte fuel cell comprising the membrane-electrode assembly according to claim 8.

* * * * *